US012610272B2

(12) United States Patent
Ma et al.

(10) Patent No.: US 12,610,272 B2
(45) Date of Patent: Apr. 21, 2026

(54) COMMUNICATION METHOD AND APPARATUS

(71) Applicant: HUAWEI TECHNOLOGIES CO., LTD., Shenzhen (CN)

(72) Inventors: Chuan Ma, Shanghai (CN); Jingwang Ma, Shanghai (CN); Yu Zhou, Shanghai (CN); Zhongping Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 18/178,770

(22) Filed: Mar. 6, 2023

(65) Prior Publication Data

US 2023/0209394 A1      Jun. 29, 2023

Related U.S. Application Data

(63) Continuation of application No. PCT/CN2020/113842, filed on Sep. 7, 2020.

(51) Int. Cl.
*H04W 28/00* (2009.01)
*H04W 28/02* (2009.01)

(52) U.S. Cl.
CPC .............................. *H04W 28/0268* (2013.01)

(58) Field of Classification Search
CPC ......... H04W 28/0268; H04W 28/0263; H04W 28/24
See application file for complete search history.

(56) References Cited

U.S. PATENT DOCUMENTS

| | | | | |
|---|---|---|---|---|
| 2014/0029536 A1* | 1/2014 | Tian | .................... | H04W 72/543 |
| | | | | 370/329 |
| 2019/0029057 A1* | 1/2019 | Pan | ........................ | H04W 76/10 |
| 2019/0357076 A1* | 11/2019 | Han | .................. | H04W 28/0268 |
| 2020/0112907 A1 | 4/2020 | Dao et al. | | |
| 2020/0236578 A1* | 7/2020 | Cakulev | ................ | H04L 47/245 |
| 2021/0153070 A1* | 5/2021 | Velev | .................... | H04W 24/08 |
| 2021/0168882 A1* | 6/2021 | Chang | .................. | H04W 76/30 |
| 2021/0351893 A1* | 11/2021 | Jin | .......................... | H04L 5/001 |
| 2022/0150749 A1* | 5/2022 | Ke | ........................ | H04W 76/15 |

FOREIGN PATENT DOCUMENTS

CN         110166377 A       8/2019

OTHER PUBLICATIONS

Huawei, Vodafone, Support of Alternative QoS Profiles, 3GPP TSG-RAN3 Meeting #108-e, Jun. 1-11, 2020, R3-203638; 4 total pages.
Nokia et al., "Support for Alternative QoS profiles," 3GPP TSG-RAN3 Meeting #108e, R3-203466, Online, Jun. 1-11, 2020; 4 total pages.

* cited by examiner

*Primary Examiner* — Lakeram Jangbahadur
(74) *Attorney, Agent, or Firm* — Rimon PC

(57)                ABSTRACT
This application relates to the field of communication technologies, and provides a communication method and apparatus, to improve transmission performance of a communication network. In the method, a first QoS flow corresponding to a plurality of QoS parameter sets is provided. In a transmission process, a terminal device, an access network device, and a UPF may adjust, based on a change of a service requirement of a target service, a QoS parameter set corresponding to the first QoS, and transmit a service of target data based on the QoS parameter set.

18 Claims, 9 Drawing Sheets

COMMUNICATION METHOD AND APPARATUS

CROSS-REFERENCE TO RELATED APPLICATIONS

This application is a continuation of International Application No. PCT/CN2020/113842 filed on Sep. 7, 2020, the disclosure of which is hereby incorporated by reference in its entirety.

TECHNICAL FIELD

This application relates to the field of communication technologies, and in particular, to a communication method and apparatus.

BACKGROUND

Currently, quality of service (QoS) control is performed on transmitted service data between a terminal device and an access network device at a granularity of a data radio bearer (DRB). The access network device and a user plane function (UPF) perform QoS control on transmitted service data at a granularity of a QoS flow. The QoS flow and the DRB are associated with a QoS parameter set corresponding to a service. A communication apparatus may determine, based on a QoS parameter preconfigured for a service, a QoS flow and a DRB that are associated with a QoS parameter set, and control service data based on the QoS flow and the DRB.

After a service status of a service changes, a QoS requirement of the service may also change accordingly. In this case, a QoS parameter preconfigured for the service no longer matches the QoS requirement of the service. This affects the transmission performance of a communication network.

SUMMARY

This application provides a communication method and apparatus, to resolve a problem in the conventional technology that a QoS parameter does not match a QoS requirement of a service.

To resolve the foregoing problem, the following technical solutions are used in this application.

According to a first aspect, a communication method is provided. The method includes: A terminal device determines first uplink data of a target service; and the terminal device sends the first uplink data to an access network device on a DRB corresponding to a first QoS parameter set, where the first QoS parameter set is a QoS parameter set corresponding to a QoS requirement of the first uplink data in a plurality of QoS parameter sets corresponding to a first QoS flow; and the first QoS flow is a QoS flow used for transmitting uplink data of the target service.

Based on the foregoing technical solution, in the communication method according to this embodiment of this application, when the target service has different QoS requirements in different service statuses, an SMF configures a corresponding QoS parameter for each QoS requirement based on the different QoS requirements of the target service, and associates the plurality of QoS parameters with one QoS flow:

In an uplink transmission process, the terminal device determines, based on a current service status of the target service, a QoS parameter set corresponding to the target service, and the terminal device sends uplink data to the access network device on a DRB corresponding to the QoS parameter set.

In this way, the terminal device may determine, in real time based on a change of the QoS requirement (corresponding to the service status) of the target service, a QoS parameter set corresponding to the target service, and send the uplink data of the target service to the access network device on a DRB corresponding to the QoS parameter set. The access network device sends the uplink data of the target service to a UPF based on the QoS parameter set on the QoS flow to which the QoS parameter set belongs. When the QoS requirement of the target service changes rapidly, the terminal device may adjust the QoS parameter of the target service in real time based on the QoS requirement of the target service, to improve a matching degree between the QoS parameter and the QoS requirement of the service, and avoid a waste of network resources of a communication network when the QoS requirement of the target service is satisfied.

With reference to the first aspect, in a possible implementation, there are a plurality of DRBs between the terminal device and the access network device, one of the plurality of QoS parameter sets corresponds to one of the plurality of DRBs, and one of the plurality of DRBs corresponds to one or more of the plurality of QoS parameter sets.

Based on this, the terminal device may determine correspondences between the QoS parameter sets and the DRBs.

With reference to the first aspect, in a possible implementation, the terminal device receives first indication information from the access network device, where the first indication information indicates the correspondences between the plurality of QoS parameter sets and the plurality of DRBs.

Based on this, the terminal device may determine, based on the first QoS flow and the first QoS parameter set that correspond to the first uplink data, the DRB for transmitting the first uplink data.

With reference to the first aspect, in a possible implementation, the terminal device sends a first identifier to the access network device, where the first identifier indicates the first QoS parameter set of the first QoS flow:

Based on this, the terminal device may indicate, to the access network device by using the first identifier, the first QoS flow and the first QoS parameter set that correspond to the first uplink data.

With reference to the first aspect, in a possible implementation, the first QoS parameter set is a QoS parameter set corresponding to a first service status index: the first service status index is a service status index, in a plurality of service status indexes of the target service, used for representing a QoS requirement of the target service in a current service status; and one of the plurality of service status indexes corresponds to one of the plurality of QoS parameter sets.

Based on this, the terminal device may determine the service status index of the target service based on the current service status of the target service. The terminal device may further determine, based on the service status index of the target service, the first QoS parameter set corresponding to the target service.

With reference to the first aspect, in a possible implementation, the terminal device receives second indication information from the SMF, where the second indication information indicates correspondences between the plurality of service status indexes and the plurality of QoS parameter sets.

Based on this, the terminal device may determine the correspondences between the plurality of service status indexes and the plurality of QoS parameter sets, so that the terminal device determines, based on the correspondence, the first QoS parameter set corresponding to the target service.

With reference to the first aspect, in a possible implementation, the second indication information specifically indicates correspondences between the plurality of service status indexes and a plurality of uplink data packet filter sets, and one of the plurality of uplink data packet filter sets corresponds to one of the plurality of QoS parameter sets.

Based on this, the terminal device may invoke a corresponding uplink data packet filter set based on the service status index of the target service, and map the first uplink data of the target service to the QoS parameter set of the first QoS flow based on the uplink data packet set.

With reference to the foregoing first aspect, in a possible implementation, the terminal device determines the first service status index based on the current service status of the target service and according to a service status index rule, where the service status index rule indicates correspondences between the plurality of service status indexes of the target service and a plurality of service statuses of the target service.

Based on this, the terminal device may accurately determine the service status index currently corresponding to the target service.

With reference to the first aspect, in a possible implementation, the terminal device receives third indication information from the SMF, where the third indication information indicates the service status index rule.

Based on this, the terminal device may determine the service status index rule, so that the terminal device determines, according to the service status index rule, the service status index currently corresponding to the target service.

With reference to the first aspect, in a possible implementation, the terminal device sends the first service status index to the UPF.

Based on this, the UPF may determine the service status index currently corresponding to the target service.

With reference to the first aspect, in a possible implementation, the first service status index is a service status index sent by an application server to the terminal device.

Based on this, the terminal device may determine the service status index currently corresponding to the target service without perceiving the service status of the target service. A calculation amount of the terminal device and power consumption of the terminal device are reduced.

According to a second aspect, a communication method is provided. The method includes: An access network device receives first uplink data from a terminal device, where the first uplink data is uplink data that is of a target service and that currently needs to be transmitted; and the access network device sends the first uplink data to a UPF on a first QoS flow based on a first QoS parameter set, where the first QoS flow is a QoS flow used for transmitting the uplink data of the target service, and the first QoS parameter set is a QoS parameter set corresponding to a QoS requirement of the first uplink data in a plurality of QoS parameter sets corresponding to the first QoS flow:

With reference to the second aspect, in a possible implementation, the access network device sends first indication information to the terminal device, where the first indication information indicates correspondences between the plurality of QoS parameter sets and a plurality of DRBs.

With reference to the second aspect, in a possible implementation, the access network device receives a first identifier from the terminal device, where the first identifier indicates the first QoS parameter set of the first QoS flow; and the access network device determines, based on the first identifier, the first QoS parameter set of the first QoS flow that carries the first uplink data.

With reference to the second aspect, in a possible implementation, the access network device receives fourth indication information from an SMF, where the fourth indication information indicates a QoS parameter of each of the plurality of QoS parameter sets.

According to a third aspect, a communication method is provided. The method includes:

A UPF determines first downlink data of a target service. The UPF sends the first downlink data on a first QoS flow to an access network device based on a first QoS parameter set, where the first QoS flow is a QoS flow used for transmitting the downlink data of the target service, and the first QoS parameter set is a QoS parameter set corresponding to a QoS requirement of the first downlink data in a plurality of QoS parameter sets corresponding to the first QoS flow:

With reference to the third aspect, in a possible implementation, the first QoS flow corresponds to a first identifier, and the first identifier indicates the first QoS parameter set.

With reference to the third aspect, in a possible implementation, the first QoS parameter set is a QoS parameter set corresponding to a first service status index: the first service status index is a service status index, in a plurality of service status indexes of the target service, used for representing a QoS requirement of the target service in a current service status: and one of the plurality of service status indexes corresponds to one of the plurality of QoS parameter sets.

With reference to the third aspect, in a possible implementation, the first service status index is a service status index sent by a terminal device to the UPF: or the first service status index is a service status index sent by an application server to the UPF.

With reference to the third aspect, in a possible implementation, the UPF receives fifth indication information from an SMF, where the fifth indication information indicates correspondences between the plurality of service status indexes and the plurality of QoS parameter sets.

With reference to the third aspect, in a possible implementation, the fifth indication information specifically indicates correspondences between the plurality of service status indexes and a plurality of downlink data packet filter sets, and one of the plurality of downlink data packet filter sets corresponds to one of the plurality of QoS parameter sets.

According to a fourth aspect, a communication method is provided. The method includes: An access network device receives first downlink data sent by a UPF on a first QoS flow based on a first QoS parameter set, where the first downlink data is downlink data that is of a target service and that currently needs to be transmitted, the first QoS flow is a QoS flow used for transmitting the downlink data of the target service, and the first QoS parameter set is a QoS parameter set corresponding to a QoS requirement of the first downlink data in a plurality of QoS parameter sets corresponding to the first QoS flow: when the first QoS flow corresponds to different QoS parameter sets, the first QoS flow is used for transmitting the downlink data of the target service when QoS requirements are different; and the access network device sends the first downlink data to the terminal device on a DRB corresponding to the first QoS parameter set.

With reference to the fourth aspect, in a possible implementation, there are a plurality of DRBs between the terminal device and the access network device, and one of the plurality of QoS parameter sets corresponds to one of the plurality of DRBs.

With reference to the fourth aspect, in a possible implementation, one of the plurality of DRBs corresponds to one or more of the plurality of QoS parameter sets.

With reference to the fourth aspect, in a possible implementation, the access network device sends first indication information to the terminal device, where the first indication information indicates correspondences between the plurality of QoS parameter sets and the plurality of DRBs.

According to a fifth aspect, a communication method is provided. The method includes: An SMF sends second indication information to a terminal device, where the second indication information indicates correspondences between a plurality of service status indexes and a plurality of QoS parameter sets, and one of the plurality of service status indexes corresponds to one of the plurality of QoS parameter sets.

With reference to the fifth aspect, in a possible implementation, the SMF sends third indication information to the terminal device, where the third indication information indicates a service status index rule.

According to a sixth aspect, a communication method is provided. The method includes: An SMF sends fourth indication information to an access network device, where the fourth indication information indicates a QoS parameter of each of a plurality of QoS parameter sets.

According to a seventh aspect, a communication method is provided. The method includes: An SMF sends fifth indication information to a UPF, where the fifth indication information indicates correspondences between a plurality of service status indexes and a plurality of QoS parameter sets, and one of the plurality of service status indexes corresponds to one of the plurality of QoS parameter sets.

With reference to the seventh aspect, in a possible implementation, the fifth indication information specifically indicates correspondences between the plurality of service status indexes and a plurality of downlink data packet filter sets, and one of the plurality of downlink data packet filter sets corresponds to one of the plurality of QoS parameter sets.

According to an eighth aspect, a communication apparatus is provided. The apparatus includes a processing unit and a communication unit. The processing unit is configured to determine first uplink data of a target service; and the processing unit is further configured to indicate the communication unit to send the first uplink data to an access network device on a DRB corresponding to a first QoS parameter set, where the first QoS parameter set is a QoS parameter set corresponding to a QoS requirement of the first uplink data in a plurality of QoS parameter sets corresponding to a first QoS flow; and the first QoS flow is a QoS flow used for transmitting uplink data of the target service.

With reference to the eighth aspect, in a possible implementation, there are a plurality of DRBs between a terminal device and an access network device, one of the plurality of QoS parameter sets corresponds to one of the plurality of DRBs, and one of the plurality of DRBs corresponds to one or more of the plurality of QoS parameter sets.

With reference to the eighth aspect, in a possible implementation, the terminal device receives first indication information from the access network device, where the first indication information indicates correspondences between the plurality of QoS parameter sets and the plurality of DRBs.

With reference to the eighth aspect, in a possible implementation, the communication unit is further configured to send a first identifier to the access network device, where the first identifier indicates the first QoS parameter set of the first QoS flow.

With reference to the eighth aspect, in a possible implementation, the first QoS parameter set is a QoS parameter set corresponding to a first service status index: the first service status index is a service status index, in a plurality of service status indexes of the target service, used for representing a QoS requirement of the target service in a current service status; and one of the plurality of service status indexes corresponds to one of the plurality of QoS parameter sets.

With reference to the eighth aspect, in a possible implementation, the communication unit is further configured to receive second indication information from an SMF, where the second indication information indicates correspondences between the plurality of service status indexes and the plurality of QoS parameter sets.

With reference to the eighth aspect, in a possible implementation, the second indication information specifically indicates correspondences between the plurality of service status indexes and a plurality of uplink data packet filter sets, and one of the plurality of uplink data packet filter sets corresponds to one of the plurality of QoS parameter sets.

With reference to the eighth aspect, in a possible implementation, the processing unit is specifically configured to determine the first service status index based on the current service status of the target service and according to a service status index rule, where the service status index rule indicates correspondences between the plurality of service status indexes of the target service and a plurality of service statuses of the target service.

With reference to the eighth aspect, in a possible implementation, the communication unit is further configured to receive third indication information from the SMF, where the third indication information indicates the service status index rule.

With reference to the eighth aspect, in a possible implementation, the communication unit is further configured to send the first service status index to a UPF.

With reference to the eighth aspect, in a possible implementation, the first service status index is a service status index sent by an application server to the terminal device.

According to a ninth aspect, a communication apparatus is provided. The apparatus includes a processing unit and a communication unit.

The processing unit is configured to indicate the communication unit to receive first uplink data from a terminal device, where the first uplink data is uplink data that is of a target service and that currently needs to be transmitted; and the processing unit is further configured to indicate the communication unit to send the first uplink data to a UPF on a first QoS flow based on a first QoS parameter set, where the first QoS flow is a QoS flow used for transmitting the uplink data of the target service, and the first QoS parameter set is a QoS parameter set corresponding to a QoS requirement of the first uplink data in a plurality of QoS parameter sets corresponding to the first QoS flow:

With reference to the ninth aspect, in a possible implementation, the processing unit is configured to indicate the communication unit to send first indication information to the terminal device, where the first indication information indicates correspondences between the plurality of QoS parameter sets and a plurality of DRBs.

With reference to the ninth aspect, in a possible implementation, the processing unit is configured to indicate the communication unit to receive a first identifier from the terminal device, where the first identifier indicates the first QoS parameter set of the first QoS flow; and the processing unit is configured to determine, based on the first identifier, the first QoS parameter set of the first QoS flow that carries the first uplink data.

With reference to the ninth aspect, in a possible implementation, the processing unit is configured to indicate the communication unit to receive fourth indication information from an SMF, where the fourth indication information indicates a QoS parameter of each of the plurality of QoS parameter sets.

According to a tenth aspect, a communication apparatus is provided. The apparatus includes a processing unit and a communication unit.

The processing unit is configured to determine first downlink data of a target service. The communication unit is configured to send the first downlink data on a first QoS flow to an access network device based on a first QoS parameter set, where the first QoS flow is a QoS flow used for transmitting the downlink data of the target service, and the first QoS parameter set is a QoS parameter set corresponding to a QoS requirement of the first downlink data in a plurality of QoS parameter sets corresponding to the first QoS flow.

With reference to the tenth aspect, in a possible implementation, the first QoS flow corresponds to a first identifier, and the first identifier indicates the first QoS parameter set.

With reference to the tenth aspect, in a possible implementation, the first QoS parameter set is a QoS parameter set corresponding to a first service status index: the first service status index is a service status index, in a plurality of service status indexes of the target service, used for representing a QoS requirement of the target service in a current service status; and one of the plurality of service status indexes corresponds to one of the plurality of QoS parameter sets.

With reference to the tenth aspect, in a possible implementation, the first service status index is a service status index sent by a terminal device to a UPF: or the first service status index is a service status index sent by an application server to a UPF.

With reference to the tenth aspect, in a possible implementation, the communication unit is further configured to receive fifth indication information from an SMF, where the fifth indication information indicates correspondences between the plurality of service status indexes and the plurality of QoS parameter sets.

With reference to the tenth aspect, in a possible implementation, the fifth indication information specifically indicates correspondences between the plurality of service status indexes and a plurality of downlink data packet filter sets, and one of the plurality of downlink data packet filter sets corresponds to one of the plurality of QoS parameter sets.

According to an eleventh aspect, a communication apparatus is provided. The apparatus includes a processing unit and a communication unit.

The processing unit is configured to indicate the communication unit to receive first downlink data sent by a UPF on a first QoS flow based on a first QoS parameter set, where the first downlink data is downlink data that is of a target service and that currently needs to be transmitted, the first QoS flow is a QoS flow used for transmitting the downlink data of the target service, and the first QoS parameter set is a QoS parameter set corresponding to a QoS requirement of the first downlink data in a plurality of QoS parameter sets corresponding to the first QoS flow: when the first QoS flow corresponds to different QoS parameter sets, the first QoS flow is used for transmitting the downlink data of the target service when QoS requirements are different; and the processing unit is further configured to indicate the communication unit to send the first downlink data to a terminal device on a DRB corresponding to the first QoS parameter set.

With reference to the eleventh aspect, in a possible implementation, there are a plurality of DRBs between the terminal device and an access network device, and one of the plurality of QoS parameter sets corresponds to one of the plurality of DRBs.

With reference to the eleventh aspect, in a possible implementation, one of the plurality of DRBs corresponds to one or more of the plurality of QoS parameter sets.

With reference to the eleventh aspect, in a possible implementation, the communication unit is further configured to send first indication information to the terminal device, where the first indication information indicates correspondences between the plurality of QoS parameter sets and the plurality of DRBs.

According to a twelfth aspect, a communication apparatus is provided. The apparatus includes a processing unit and a communication unit.

The processing unit is configured to determine second indication information. The communication unit is configured to send the second indication information to a terminal device, where the second indication information indicates correspondences between a plurality of service status indexes and a plurality of QoS parameter sets, and one of the plurality of service status indexes corresponds to one of the plurality of QoS parameter sets.

With reference to the twelfth aspect, in a possible implementation, the processing unit is further configured to determine third indication information. The communication unit is further configured to send the third indication information to the terminal device, where the third indication information indicates a service status index rule.

According to a thirteenth aspect, a communication apparatus is provided. The apparatus includes a processing unit and a communication unit.

The processing unit is configured to determine fourth indication information. The communication unit is configured to send the fourth indication information to an access network device, where the fourth indication information indicates a QoS parameter of each of a plurality of QoS parameter sets.

According to a fourteenth aspect, a communication apparatus is provided. The apparatus includes a processing unit and a communication unit.

The processing unit is configured to determine fifth indication information. The communication unit is configured to send the fifth indication information to a UPF, where the fifth indication information indicates correspondences between a plurality of service status indexes and a plurality of QoS parameter sets, and one of the plurality of service status indexes corresponds to one of the plurality of QoS parameter sets.

With reference to the fourteenth aspect, in a possible implementation, the fifth indication information specifically indicates correspondences between the plurality of service status indexes and a plurality of downlink data packet filter sets, and one of the plurality of downlink data packet filter sets corresponds to one of the plurality of QoS parameter sets.

According to a fifteenth aspect, this application provides a communication apparatus, including a processor, a storage medium, at least one processor, and an interface circuit. The interface circuit is configured to: receive a signal from a communication apparatus other than the communication apparatus and transmit the signal to the processor: or send a signal from the processor to a communication apparatus other than the communication apparatus. The processor is configured to implement, by using a logic circuit or executing code instructions, the method according to any one of the first aspect and the possible implementations of the first aspect. The communication apparatus may be a terminal device, or may be a chip in the terminal device.

According to a sixteenth aspect, this application provides a communication apparatus, including a processor, a storage medium, at least one processor, and an interface circuit. The interface circuit is configured to: receive a signal from a communication apparatus other than the communication apparatus and transmit the signal to the processor: or send a signal from the processor to a communication apparatus other than the communication apparatus. The processor is configured to implement, by using a logic circuit or executing code instructions, the method according to any one of the second aspect and the possible implementations of the second aspect. The communication apparatus may be an access network device, or may be a chip in the access network device.

According to a seventeenth aspect, this application provides a communication apparatus, including a processor, a storage medium, at least one processor, and an interface circuit. The interface circuit is configured to: receive a signal from a communication apparatus other than the communication apparatus and transmit the signal to the processor: or send a signal from the processor to a communication apparatus other than the communication apparatus. The processor is configured to implement, by using a logic circuit or executing code instructions, the method according to any one of the third aspect and the possible implementations of the third aspect. The communication apparatus may be a terminal device, or may be a chip in the terminal device.

According to an eighteenth aspect, this application provides a communication apparatus, including a processor, a storage medium, at least one processor, and an interface circuit. The interface circuit is configured to: receive a signal from a communication apparatus other than the communication apparatus and transmit the signal to the processor: or send a signal from the processor to a communication apparatus other than the communication apparatus. The processor is configured to implement, by using a logic circuit or executing code instructions, the method according to any one of the fourth aspect and the possible implementations of the fourth aspect. The communication apparatus may be an access network device, or may be a chip in the access network device.

According to a nineteenth aspect, this application provides a communication apparatus, including a processor, a storage medium, at least one processor, and an interface circuit. The interface circuit is configured to: receive a signal from a communication apparatus other than the communication apparatus and transmit the signal to the processor; or send a signal from the processor to a communication apparatus other than the communication apparatus. The processor is configured to implement, by using a logic circuit or executing code instructions, the method according to any one of the fifth aspect and the possible implementations of the fifth aspect. The communication apparatus may be an SMF, or may be a chip in the SMF.

According to a twentieth aspect, this application provides a communication apparatus, including a processor, a storage medium, at least one processor, and an interface circuit. The interface circuit is configured to: receive a signal from a communication apparatus other than the communication apparatus and transmit the signal to the processor: or send a signal from the processor to a communication apparatus other than the communication apparatus. The processor is configured to implement, by using a logic circuit or executing code instructions, the method according to any one of the sixth aspect and the possible implementations of the sixth aspect. The communication apparatus may be an SMF, or may be a chip in the SMF.

According to a twenty-first aspect, this application provides a communication apparatus, including a processor, a storage medium, at least one processor, and an interface circuit. The interface circuit is configured to: receive a signal from a communication apparatus other than the communication apparatus and transmit the signal to the processor: or send a signal from the processor to a communication apparatus other than the communication apparatus. The processor is configured to implement, by using a logic circuit or executing code instructions, the method according to any one of the seventh aspect and the possible implementations of the seventh aspect. The communication apparatus may be an SMF, or may be a chip in the SMF.

According to a twenty-second aspect, this application provides a communication system, including a first communication apparatus, a second communication apparatus, and a third communication apparatus. The first communication apparatus is configured to perform the method according to any one of the first aspect and the possible implementations of the first aspect: the second communication apparatus is configured to perform the method according to any one of the second aspect and the possible implementations of the second aspect; and the third communication apparatus is configured to perform the method according to any one of the fifth aspect and the possible implementations of the fifth aspect; and/or the third communication apparatus is configured to perform the method according to any one of the sixth aspect and the possible implementations of the sixth aspect; and/or the third communication apparatus is configured to perform the method according to any one of the seventh aspect and the possible implementations of the seventh aspect.

According to a twenty-third aspect, this application provides a communication system, including a third communication apparatus, a fourth communication apparatus, and a fifth communication apparatus. The fourth communication apparatus is configured to perform the method according to any one of the third aspect and the possible implementations of the third aspect: the fifth communication apparatus is configured to perform the method according to any one of the fourth aspect and the possible implementations of the fourth aspect; and the third communication apparatus is configured to perform the method according to any one of the fifth aspect and the possible implementations of the fifth aspect; and/or the third communication apparatus is configured to perform the method according to any one of the sixth aspect and the possible implementations of the sixth aspect; and/or the third communication apparatus is configured to perform the method according to any one of the seventh aspect and the possible implementations of the seventh aspect.

According to a twenty-fourth aspect, this application provides a computer-readable storage medium. The computer-readable storage medium stores instructions. When the instructions are run on a computer, the computer is enabled to perform the method according to any one of the first aspect and the possible implementations of the first aspect.

According to a twenty-fifth aspect, this application provides a computer-readable storage medium. The computer-readable storage medium stores instructions. When the instructions are run on a computer, the computer is enabled to perform the method according to any one of the second aspect and the possible implementations of the second aspect.

According to a twenty-sixth aspect, this application provides a computer-readable storage medium. The computer-readable storage medium stores instructions. When the instructions are run on a computer, the computer is enabled to perform the method according to any one of the third aspect and the possible implementations of the third aspect.

According to a twenty-seventh aspect, this application provides a computer-readable storage medium. The computer-readable storage medium stores instructions. When the instructions are run on a computer, the computer is enabled to perform the method according to any one of the third aspect and the possible implementations of the third aspect.

According to a twenty-eighth aspect, this application provides a computer-readable storage medium. The computer-readable storage medium stores instructions. When the instructions are run on a computer, the computer is enabled to perform the method according to any one of the fourth aspect and the possible implementations of the fourth aspect.

According to a twenty-ninth aspect, this application provides a computer-readable storage medium. The computer-readable storage medium stores instructions. When the instructions are run on a computer, the computer is enabled to perform the method according to any one of the fifth aspect and the possible implementations of the fifth aspect.

According to a thirtieth aspect, this application provides a computer-readable storage medium. The computer-readable storage medium stores instructions. When the instructions are run on a computer, the computer is enabled to perform the method according to any one of the sixth aspect and the possible implementations of the sixth aspect.

According to a thirty-first aspect, this application provides a computer-readable storage medium. The computer-readable storage medium stores instructions. When the instructions are run on a computer, the computer is enabled to perform the method according to any one of the seventh aspect and the possible implementations of the seventh aspect.

According to a thirty-second aspect, this application provides a computer program product including instructions. When the computer program product runs on a computer, the computer is enabled to perform the method according to any one of the first aspect and the possible implementations of the first aspect.

According to a thirty-third aspect, this application provides a computer program product including instructions. When the computer program product runs on a computer, the computer is enabled to perform the method according to any one of the second aspect and the possible implementations of the second aspect.

According to a thirty-fourth aspect, this application provides a computer program product including instructions. When the computer program product runs on a computer, the computer is enabled to perform the method according to any one of the third aspect and the possible implementations of the third aspect.

According to a thirty-fifth aspect, this application provides a computer program product including instructions. When the computer program product runs on a computer, the computer is enabled to perform the method according to any one of the fourth aspect and the possible implementations of the fourth aspect.

According to a thirty-sixth aspect, this application provides a computer program product including instructions.

When the computer program product runs on a computer, the computer is enabled to perform the method according to any one of the fifth aspect and the possible implementations of the fifth aspect.

According to a thirty-seventh aspect, this application provides a computer program product including instructions. When the computer program product runs on a computer, the computer is enabled to perform the method according to any one of the sixth aspect and the possible implementations of the sixth aspect.

According to a thirty-eighth aspect, this application provides a computer program product including instructions. When the computer program product runs on a computer, the computer is enabled to perform the method according to any one of the seventh aspect and the possible implementations of the seventh aspect.

It should be understood that, descriptions of technical features, technical solutions, beneficial effects, or similar words in this application do not imply that all features and advantages can be implemented in any individual embodiment. On the contrary, it may be understood that, the descriptions of the features or the beneficial effects mean that at least one embodiment includes a specific technical feature, technical solution, or beneficial effect. Therefore, the descriptions of the technical features, the technical solutions, or the beneficial effects in this specification may not necessarily be specific to a same embodiment. Further, the technical features, the technical solutions, and the beneficial effects described in embodiments may be combined in any proper manner. A person skilled in the art may understand that an embodiment may be implemented without one or more specific technical features, technical solutions, or beneficial effects in a specific embodiment. In other embodiments, additional technical features and beneficial effects may be further identified in a specific embodiment that does not reflect all embodiments.

DESCRIPTION OF EMBODIMENTS

In descriptions of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In descriptions of this application, unless otherwise specified, "a plurality of" means two or more than two. "At least one" means any one or any combination of more than one, and "at least one" means any one or any combination of more than one. For example, at least one of A, B, and C may include the following cases: 1. A; 2. B; 3. C; 4. A and B; 5. A and C; 6. B and C; 7. A, B, and C.

In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

This application may be applied to a 4th generation (4G) system, various systems evolved based on the 4G system, a 5th generation (5G) system, and various systems evolved based on the 5G system. The 4G system may also be referred to as an evolved packet system (EPS). A core network of the 4G system may be referred to as an evolved packet core (EPC), and an access network may be referred to as long term evolution (LTE). A core network of the 5G system may be referred to as a 5GC (5G core), and an access network may be referred to as new radio (NR). For ease of description, this application is described below by using an example in which this application is applied to the 5G system. However, it may be understood that this application is also applicable to the 4G system, a 3rd generation (3G) system, and the like. This is not limited.

Figures 1, 2:
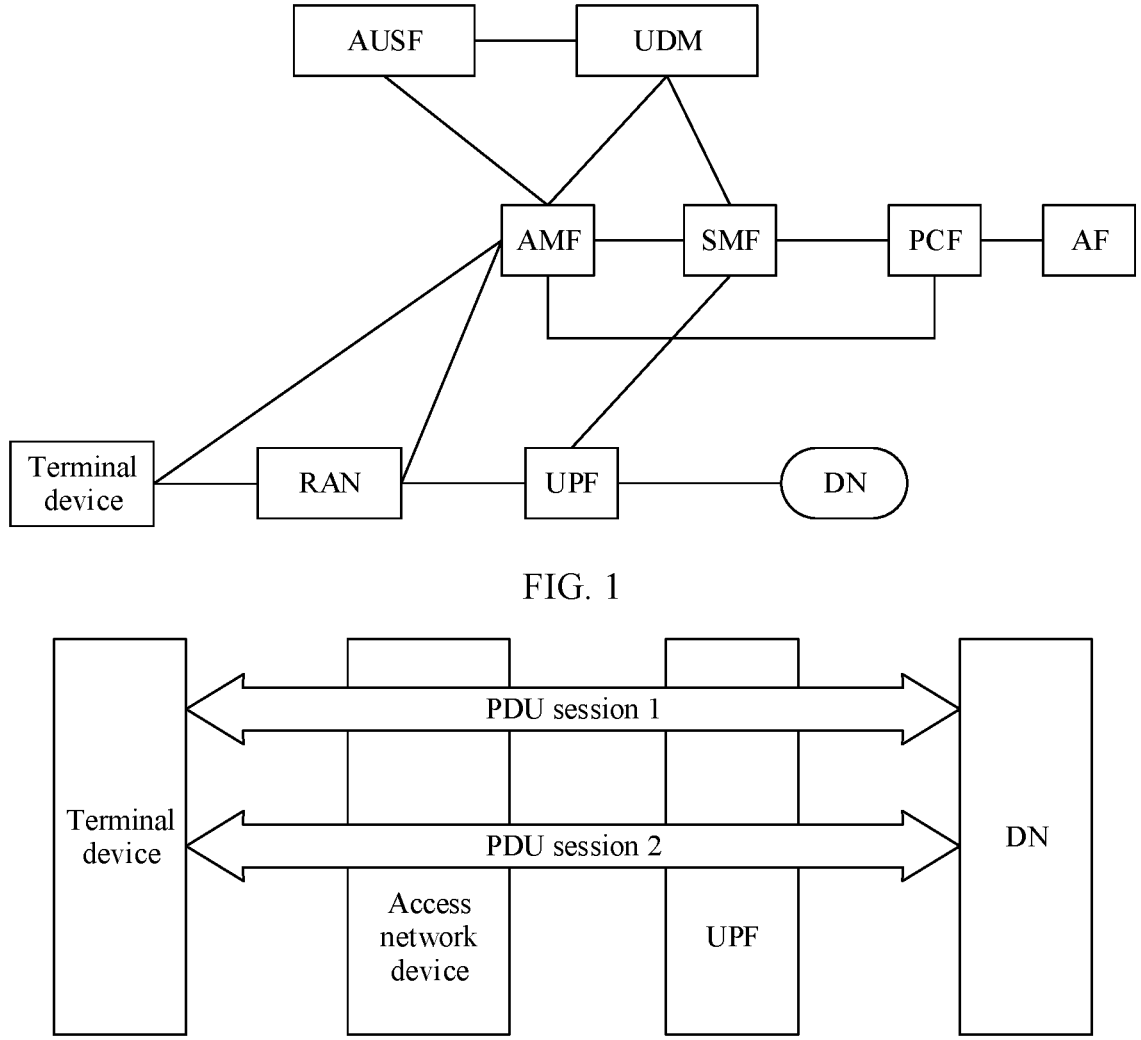
FIG. 1 is a schematic diagram of an architecture of a 5G system according to an embodiment of this application.
FIG. 2 is a schematic diagram of a PDU session according to an embodiment of this application.

FIG. 1 shows an example of a schematic diagram of a network architecture of a 5G system. In this schematic diagram, the 5G system may include an authentication server function (AUSF) network element, an access and mobility management function (core access and mobility management function, AMF) network element, a data network (DN), a unified data management (UDM) network element, a policy control function (PCF) network element, a radio access network (RAN) network element, a user plane function (UPF) network element, a terminal device (terminal), an application function (AF) network element, and a session management function (SMF) network element.

It should be noted that the RAN network element, the AMF network element, the SMF network element, the AUSF network element, the UDM network element, the UPF network element, the PCF network element, and the like in FIG. 1 are merely names, and the names constitute no limitation on the network elements. In a 5G network and another future network, entities or devices corresponding to these network elements may have other names. This is not specifically limited in embodiments of this application. For example, the UDM network element may alternatively be replaced with a home subscriber server (HSS), a user subscription database (USD), a database network element, or the like. A general description is provided herein, and details are not described below again.

For ease of description, the RAN network element, the AMF network element, the SMF network element, the UDM network element, the UPF network element, the PCF network element, and the like are respectively represented by using a RAN, an AMF, an SMF, a UDM, a UPF, a PCF, and the like in the following descriptions.

FIG. 1 shows an interaction relationship and a corresponding interface between the network elements. For example, the terminal device and the AMF may interact with each other through an interface N1, and an interaction message is referred to as an N1 message. Some interfaces are implemented as service-oriented interfaces.

Functions of some network elements in FIG. 1 are as follows:

The PCF has a function of providing a policy rule and the like to a control plane network element.

The UDM has functions such as user subscription data management and generation of user authentication information.

The AF may be an application server, and may belong to an operator or a third party. The AF mainly supports interaction with a 3rd generation partnership project (3GPP) core network to provide a service, for example, affect a data routing decision and a policy control function or provide some third-party services to a network side.

The AMF may also be referred to as an access management device, and is mainly responsible for functions of a signaling processing part, for example, terminal device registration management, terminal device connection management, terminal device reachability management, terminal device access authorization and access authentication, a terminal device security function, terminal device mobility management, network slice selection, SMF selection, and terminal device attach and detach. The AMF serves as an anchor point of a connection between N1 signaling and N2 signaling, provides routing of an N1/N2 interface session management (SM) message to the SMF, and maintains and manages status information of the terminal device. When the AMF network element provides a service to a session in the terminal device, the AMF network element provides a control plane storage resource to the session, to store a session context, for example, a session identifier, an SMF identifier associated with the session identifier, and the like.

The SMF is mainly responsible for all control plane functions of session management of the terminal device, including UPF selection, control, and redirection, internet protocol (IP) address assignment and management, session QoS management, and obtaining a policy and charging control (PCC) policy from the PCF, bearer establishment, modification, and release, QoS control, and the like. The SMF also serves as a termination of an SM part in a non-access stratum (NAS) message.

The UPF serves as an anchor point of a protocol data unit (PDU) session connection, and is responsible for data packet filtering and data transmission/forwarding (for example, receiving data from a DN and transmitting the data to the terminal device through an access network device: or receiving data from the terminal device through an access network device and sending the data to a DN) of the terminal device, rate control, charging information generation, user-plane QoS processing, uplink transmission authentication, transmission level verification, downlink data packet buffering, downlink data notification triggering, and the like. The UPF may also serve as a branching point of a multi-homed PDU session. A resource transmission and scheduling function that is of the UPF and that serves the terminal device is managed and controlled by the SMF.

The RAN (which may also be referred to as a next generation radio access network (NG-RAN)) is a network including a plurality of access network devices (which may also be referred to as access network elements, network devices, or RAN nodes), and implements functions such as a radio physical layer function, resource scheduling and radio resource management, radio access control and mobility management functions, quality of service management, and data compression and encryption. The access network device in embodiments of this application refers to a radio access network device. The access network device is connected to the UPF through a user plane interface N3, and is configured to transmit data of the terminal device. The access network device establishes a control plane signaling connection to the AMF through a control plane interface N2, to implement functions such as radio access bearer control. The access network device is an access device that is used by the terminal device to access a mobile communication system in a wireless manner, and may be a base station, an evolved NodeB (eNodeB), a transmission reception point (TRP), a next generation NodeB (gNB), a base station in a future mobile communication system, an access node in a wireless fidelity (Wi-Fi) system, or the like. The access network device in this application may be a complete entity, or may be in a form in which a central unit (CU) and a distributed unit (DU) are separated. A plurality of DUs may be all controlled by one CU. Logical functions of the CU and the DU may be deployed on a single physical entity, or may be deployed on different physical entities.

The terminal device may be a wireless terminal device or a wired terminal device. The wireless terminal device may be a device that provides a user with voice and/or data connectivity, a handheld device having a wireless connection function, or another processing device connected to a wireless modem. The terminal device and the access network device communicate with each other by using an air interface technology (for example, an NR technology or an LTE technology). Alternatively, terminal devices may communicate with each other by using an air interface technology (for example, an NR technology or an LTE technology). The wireless terminal device may communicate with one or more core network devices through an access network device, for example, communicate with the AMF, the SMF, or the like. The terminal device may be a mobile terminal device, such as a mobile phone (or referred to as a "cellular" phone), a smartphone, a satellite wireless device, a wireless terminal device in industrial control, a wireless terminal device in unmanned driving, a wireless terminal device in remote surgery, a wireless terminal device in a smart grid, a wireless terminal device in transportation security, a wireless terminal device in a smart city, a wireless terminal device in a smart home, a wireless modem card, and a computer having a mobile terminal device (for example, which may be a laptop, portable, pocket-sized, handheld, computer built-in, or vehicle-mounted mobile apparatus). They exchange voice and/or data with the access network device. For example, the wireless terminal device may be a device, for example, a personal communication service (PCS) phone, a mobile phone, a tablet computer, a computer with a wireless transceiver function, an AR terminal device, a VR terminal device, an MR terminal device, an XR terminal device, a cordless telephone set, or a session initiation protocol (SIP) phone, a wireless local loop (WLL) station, a personal digital assistant (PDA), or a machine type communication terminal device. In vehicle-to-everything communication, a communication device mounted on a vehicle is a terminal device, and a road side unit (RSU) may also be used as a terminal device. A communication device mounted on an uncrewed aerial vehicle may also be considered as a terminal device. The terminal device may also be referred to as user equipment (UE), a terminal, a mobile terminal (mobile terminal, MT), a subscriber unit, a subscriber station, a mobile station, a remote station, an access point, an access terminal, a user terminal, a user agent, or the like.

It may be understood that, in addition to the functional network elements shown in FIG. 1, the network architecture of the 5G network may further include another functional network element. In embodiments of this application, the network element may also be referred to as an entity, a device, or the like.

The terminal device, the RAN, the UPF, and the DN in FIG. 1 are generally referred to as user plane network elements. Data traffic of a user may be transmitted through a PDU session established between the terminal device and the DN, and the transmission passes through the two network elements: the RAN and the UPF. A user plane is used for carrying service data. Other network elements in FIG. 1 are referred to as control plane network elements, and are mainly responsible for functions such as authentication and authorization, registration management, session management, mobility management, and policy control, to implement reliable and stable transmission of user-layer traffic. A control plane is used for carrying a signaling message.

The foregoing briefly describes an application scenario of this application.

To facilitate understanding of technical solutions provided in embodiments of this application, some terms in embodiments of this application are first explained and described.

1. PDU Session

As shown in FIG. 2, a PDU session is a connection between a terminal device and a DN, and is used for providing a PDU connection service. A type of the PDU session may be an IP connection, an Ethernet connection, an unstructured data connection, or the like. A PDU connection service supported by a core network in a 5G system refers to a service that provides PDU exchange between a terminal device and a DN determined by using a data network name (DNN). The terminal device may initiate establishment of one or more PDU sessions, to connect to a same DN or different DNs. For example, in FIG. 2, the terminal device initiates establishment of a PDU session 1 and a PDU session 2, to connect to a same DN.

2. QoS Flow

A QoS flow is a finest QoS differentiation granularity in a PDU session, and one QoS flow identifier (QFI) is used for identifying one QoS flow: One PDU session may include a plurality of QoS flows, and each QoS flow may carry a plurality of services.

In a current communication system, between an access network device and a core network device, the access network device and the core network device perform QoS control on transmitted service data at a granularity of a QoS flow.

Specifically, in a downlink transmission process, a UPF determines, based on a QoS requirement of a target service, a QoS flow corresponding to the target service. The UPF maps downlink data of the target service to the QoS flow corresponding to the target service, and sends the downlink data of the target service to the access network device.

In an uplink transmission process, the access network device determines, based on uplink data that is of the target service and that is received from a terminal device, a QoS flow corresponding to the target service. The access network device maps the uplink data of the target service to the QoS flow corresponding to the target service, and sends the uplink data of the target service to the UPF.

3. DRB

In a current communication system, between a terminal device and an access network device, the terminal device and the access network device perform QoS control on transmitted service data at a granularity of a DRB.

Specifically, in a downlink transmission process, after receiving downlink data of a target service from a UPF, the access network device determines, based on a QoS flow corresponding to the downlink data of the target service, a DRB corresponding to the QoS flow. The access network device sends the downlink data of the target service to the terminal device on the DRB corresponding to the QoS flow.

In an uplink transmission process, the terminal device determines, based on a QoS requirement of the target service, a QoS flow corresponding to the target service, and determines, based on the QoS flow corresponding to uplink data of the target service, a DRB corresponding to the QoS flow. The terminal device sends the uplink data of the target service to the access network device on the DRB corresponding to the QoS flow.

4. Correspondence Between a QoS Flow and a DRB

Currently, one QoS flow corresponds to one QoS parameter, and one QoS parameter corresponds to one DRB. Therefore, one QoS flow corresponds to one DRB. In addition, one DRB may correspond to one or more QoS parameters. Therefore, one DRB corresponds to one or more QoS flows.

It should be noted that the correspondence between a QoS flow and a DRB may be configured by an access network device. After the access network device configures the correspondence, an access network stores the correspondence, and sends the correspondence to a terminal device. The access network device and the terminal device may map data on a QoS flow to a DRB based on the correspondence, and transmit the data based on the DRB. One QoS flow corresponds to one DRB, and one DRB corresponds to one or more QoS flows.

5. QoS Parameter Set

The QoS parameter set includes at least one of the following: a 5G QoS identifier (5QI), an allocation and reservation priority, a reflective QoS attribute, a guaranteed flow bit rate, a maximum flow bit rate, notification control, and a maximum packet loss rate.

In the foregoing parameters, the 5QI is an integer, and each integer value corresponds to one QoS characteristic. Content of the QoS characteristic includes a resource type, a priority, a data packet delay budget, a data packet error rate, an average window, a maximum burst data amount, and the like.

6. Data Packet Filter Set

One data packet filter set includes one or more data packet filters. The data packet filter includes one or more data packet filtering rules. The data packet filter is used for filtering data. Data that satisfies the data packet filtering rule can pass through the data packet filter, and data that does not satisfy the data packet filtering rule cannot pass through the data packet filter. For a data packet filter set, a data packet that satisfies a data packet filtering rule in any data packet filter in the data packet filter set can pass through the data packet filter set.

One data packet filter set corresponds to one QoS flow. One QoS flow corresponds to one or more data packet filter sets.

A data packet filter set can map a data packet that passes through the data packet filter set to a QoS flow corresponding to the data packet filter set. A data packet that passes through the data packet filter set is carried on the QoS flow corresponding to the data packet filter set for transmission.

For example, a parameter of a data packet filter used for filtering an IP data packet includes at least one of the following: a source/destination IP address, a source/destination port number, a protocol identifier, a service type, a flow label, and a security parameter index. A data packet that is consistent with the parameter of the data packet filter can pass through the data packet filter.

After an IP data packet reaches a communication apparatus, the communication apparatus invokes a plurality of data packet filter sets to filter the IP data packet, and determines a data packet filter that the IP data packet can pass. The communication apparatus maps the IP data packet to a QoS flow corresponding to a data packet filter set to which the filter belongs. The communication apparatus transmits the IP data packet on the QoS flow.

It should be noted that the data packet filter includes an uplink data packet filter and a downlink data packet filter. The data packet filter set includes an uplink data packet filter set and a downlink data packet filter set. The uplink data packet filter and the uplink data packet filter set are used for filtering uplink data, and the downlink data packet filter and the downlink data packet filter set are used for filtering downlink data. For a specific implementation process, refer to the foregoing descriptions. Details are not described again in this application.

The foregoing briefly describes some content and concepts in this application.

Currently, to resolve a problem that a QoS parameter pre-configured for a service does not match a QoS requirement of the service after the QoS requirement of the service changes, a QoS reconfiguration method is provided. Specifically, a control plane network element SMF reconfigures QoS configuration information that corresponds to the service and that is in a communication apparatus, and adjusts the QoS parameter configured for the service to a QoS parameter that matches the changed QoS requirement of the service. The SMF reconfigures a QoS flow and a DRB that are associated with the QoS parameter. After the configuration is completed, the communication apparatus performs QoS control on service data of the service based on reconfigured QoS configuration information.

Although the foregoing method can adjust the QoS parameter based on the QoS requirement of the service, in the method, the QoS configuration information needs to be reconfigured from a control plane. A configuration process is time-consuming, and cannot be applied to a service whose QoS requirement rapidly changes with time.

To ensure the QoS requirement of the service whose QoS requirement rapidly changes with time, the SMF configures a QoS parameter of the service as a QoS parameter that matches a highest QoS requirement of the service, and controls service data of the service by using a DRB and a QoS flow that are associated with the QoS parameter.

The method can ensure a QoS requirement of a service. However, when the service has a low QoS requirement, QoS provided by a communication network for the service is greater than the QoS requirement of the service. This causes a waste of network resources of the communication network.

To resolve the foregoing technical problem, embodiments of this application provide a communication method and apparatus. When a target service has different QoS requirements in different service statuses, an SMF configures a corresponding QoS parameter for each QoS requirement based on the different QoS requirements of the target service, and associates the plurality of QoS parameters with one QoS flow.

In an uplink transmission process, a terminal device determines, based on a current service status of the target service, a QoS parameter set corresponding to the target service, and the terminal device sends uplink data to an access network device on a DRB corresponding to the QoS parameter set.

In this way, the terminal device may determine, in real time based on a change of the QoS requirement (corresponding to the service status) of the target service, a QoS parameter set corresponding to the target service, and send the uplink data of the target service to the access network device on a DRB corresponding to the QoS parameter set. When the QoS requirement of the target service changes rapidly, the terminal device may adjust the QoS parameter of the target service in real time based on the QoS requirement of the target service, to improve a matching degree between the QoS parameter and the QoS requirement of the service, and avoid a waste of network resources of a communication network when the QoS requirement of the target service is satisfied.

In a downlink transmission process, a UPF determines, based on a current service status of the target service, a QoS parameter set corresponding to the target service, and the UPF sends downlink data to the access network device on the QoS flow corresponding to the QoS parameter set.

In this way, the UPF may determine, in real time based on a change of the QoS requirement of the target service, a QoS parameter set corresponding to the target service, and send the downlink data of the target service to the access network device on the QoS flow corresponding to the QoS parameter set. When the QoS requirement of the target service changes rapidly, the UPF may adjust the QoS parameter of the target service in real time based on the QoS requirement of the target service, to improve a matching degree between the QoS parameter and the QoS requirement of the service, and avoid a waste of network resources of a communication network when the QoS requirement of the target service is satisfied.

The following describes in detail the communication method provided in this application. In different transmission scenarios, implementation processes of the communication method provided in this application are different. The following separately describes the implementation processes. The transmission scenarios include an uplink transmission scenario (denoted as a scenario 1) and a downlink transmission scenario (denoted as a scenario 2).

Scenario 1: Uplink Transmission Scenario

Figures 3, 4:
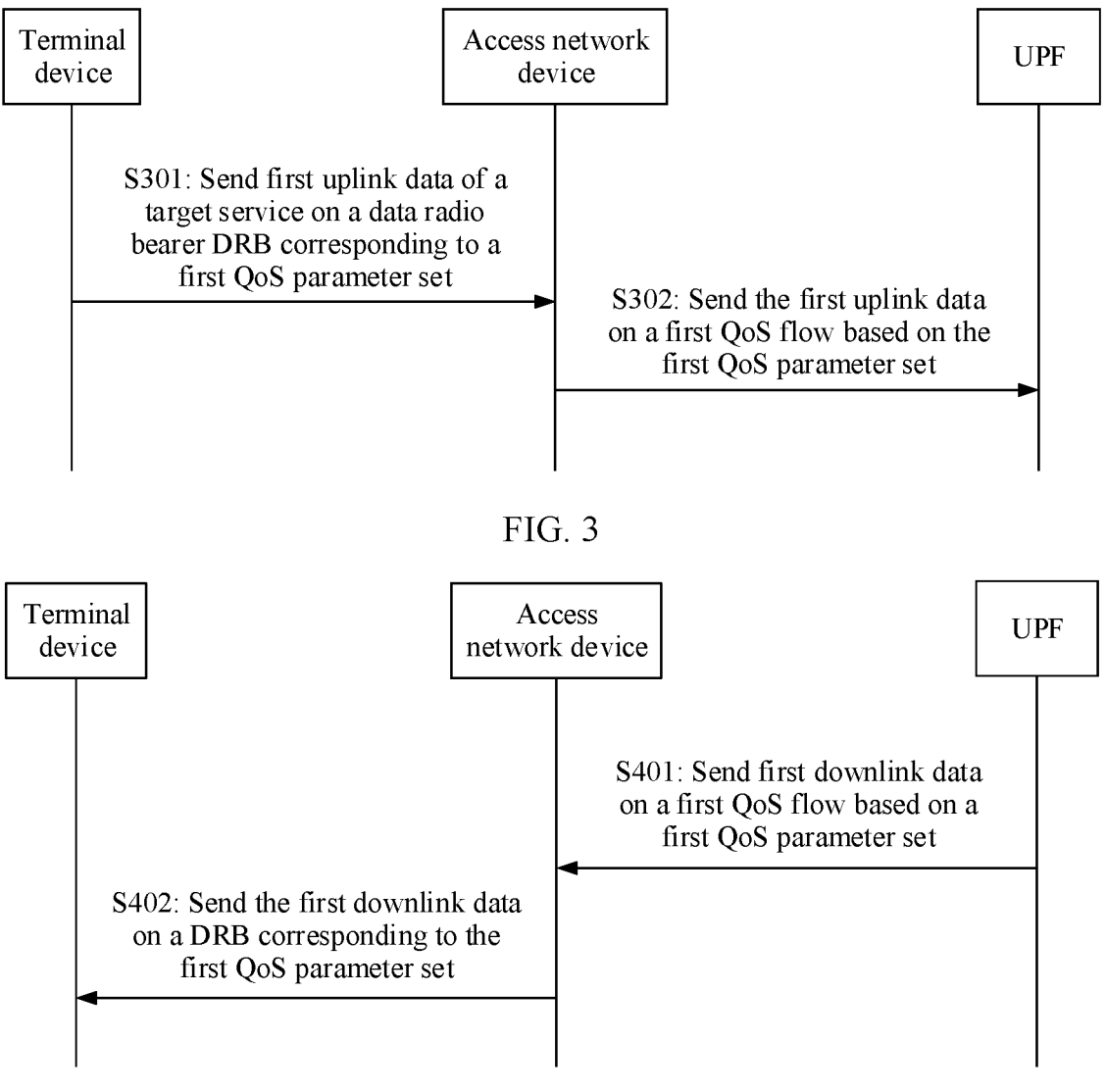
FIG. 3 is an interactive flowchart of a communication method according to an embodiment of this application.
FIG. 4 is an interactive flowchart of another communication method according to an embodiment of this application.

In the scenario, as shown in FIG. 3, a communication method according to an embodiment of this application includes the following steps.

S301: A terminal device sends first uplink data of a target service to an access network device on a DRB corresponding to a first QoS parameter set. Correspondingly, the access network device receives the first uplink data from the terminal device.

The first QoS parameter set is a QoS parameter set corresponding to a QoS requirement of first uplink data in a plurality of QoS parameter sets corresponding to a first QoS flow, and the first QoS flow is a QoS flow used for transmitting uplink data of the target service. The first uplink data is current uplink data that is of the target service and that is determined by the terminal device.

The following describes a correspondence between a QoS requirement of the target service, a QoS parameter set, the first QoS flow, and a DRB.

The target service has a plurality of QoS requirements, a plurality of QoS parameter sets are configured for the target service, and one QoS requirement corresponds to one QoS parameter set. The target service may correspond to different QoS parameter sets when QoS requirements are different.

The first QoS flow corresponding to the target service includes the plurality of QoS parameter sets configured for the target service, and the first QoS flow corresponds to one of the plurality of QoS parameter sets at a same time point. The first QoS flow may correspond to different QoS parameter sets at different time points.

One QoS parameter set corresponds to one DRB, and one DRB may correspond to one or more QoS parameter sets.

Based on the foregoing correspondence, in a possible implementation, the terminal device determines a current QoS requirement of the target service, and determines, based on the current QoS requirement of the target service, a QoS parameter set (denoted as the first QoS parameter set) currently corresponding to the target service. The terminal device sends the first uplink data of the target service to the access network device on the DRB corresponding to the first QoS parameter set.

S302: The access network device sends the first uplink data to a UPF on the first QoS flow based on the first QoS parameter set. Correspondingly, the UPF receives the first uplink data from the access network device.

In a possible implementation, after the access network device receives the first uplink data from the terminal device, the access network device determines the first QoS parameter set corresponding to the first uplink data. The access network device determines the first QoS flow to which the first QoS parameter set belongs. The access network device sends the first uplink data to the UPF based on the first QoS parameter set on the first QoS flow to which the first QoS parameter set belongs.

Based on the foregoing technical solution, in the communication method according to this embodiment of this application, when the target service has different QoS requirements in different service statuses, an SMF configures a corresponding QoS parameter for each QoS requirement based on the different QoS requirements of the target service, and associates the plurality of QoS parameters with one QoS flow.

In an uplink transmission process, the terminal device determines, based on a current service status of the target service, a QoS parameter set corresponding to the target service, and the terminal device sends uplink data to the access network device on a DRB corresponding to the QoS parameter set.

In this way, the terminal device may determine, in real time based on a change of the QoS requirement (corresponding to the service status) of the target service, a QoS parameter set corresponding to the target service, and send uplink data of the target service to the access network device on a DRB corresponding to the QoS parameter set. The access network device sends the uplink data of the target service to the UPF based on the QoS parameter set on the QoS flow to which the QoS parameter set belongs. When the QoS requirement of the target service changes rapidly, the terminal device may adjust the QoS parameter of the target service in real time based on the QoS requirement of the target service, to improve a matching degree between the QoS parameter and the QoS requirement of the service, and avoid a waste of network resources of a communication network when the QoS requirement of the target service is satisfied.

Scenario 2: Downlink Transmission Scenario

In the scenario, as shown in FIG. 4, a communication method according to an embodiment of this application includes the following steps.

S401: A UPF sends first downlink data on a first QoS flow to an access network device based on a first QoS parameter set. Correspondingly, the access network device receives the first downlink data from the UPF.

The first QoS flow is a QoS flow used for transmitting the downlink data of a target service, and the first QoS parameter set is a QoS parameter set corresponding to a QoS requirement of the first downlink data in a plurality of QoS parameter sets corresponding to the first QoS flow.

In a possible implementation, the UPF determines a current QoS requirement of the target service, and determines, based on the current QoS requirement of the target service, a QoS parameter set (denoted as the first QoS parameter set) currently corresponding to the target service. The UPF sends the first downlink data to the access network device based on the first QoS parameter set on the first QoS flow to which the first QoS parameter set belongs.

S402: The access network device sends the first downlink data to the terminal device on a DRB corresponding to the first QoS parameter set.

For a correspondence between the QoS requirement of the target service, the QoS parameter set, the first QoS flow, and the DRB, refer to the descriptions in S301. Details are not described herein again.

Based on the foregoing technical solution, in the communication method according to this embodiment of this application, when the target service has different QoS requirements in different service statuses, an SMF configures a corresponding QoS parameter for each QoS requirement based on the different QoS requirements of the target service, and associates the plurality of QoS parameters with one QoS flow.

In a downlink transmission process, the UPF determines, based on a current service status of the target service, a QoS parameter set corresponding to the target service, and the UPF sends downlink data to the access network device on the QoS flow corresponding to the QoS parameter set.

In this way, the UPF may determine, in real time based on a change of the QoS requirement of the target service, a QoS parameter set corresponding to the target service, and send the downlink data of the target service to the access network device on the QoS flow corresponding to the QoS parameter set. The access network device sends the downlink data of the target service to the terminal device on a DRB corresponding to the QoS parameter set. When the QoS requirement of the target service changes rapidly, the UPF may adjust the QoS parameter of the target service in real time based on the QoS requirement of the target service, to improve a matching degree between the QoS parameter and the QoS requirement of the service, and avoid a waste of network resources of a communication network when the QoS requirement of the target service is satisfied.

In a possible implementation, a feature of the first QoS flow recorded in this embodiment of this application includes at least one of the following: a feature 1 that the first QoS flow corresponds to the plurality of QoS parameter sets; a feature 2 that the first QoS flow corresponds to two identifiers; and a feature 3 that the first QoS flow corresponds to one or more DRBs. The foregoing features are applicable to either of the scenario 1 and the scenario 2. The following separately describes the foregoing three features of the first QoS flow.

Feature 1: The First QoS Flow Corresponds to the Plurality of QoS Parameter Sets.

Specifically, in a QoS configuration phase, a control plane of a network side configures the plurality of QoS parameter sets for the first QoS flow. The first QoS flow corresponds to one of the plurality of QoS parameter sets at a same time point. The first QoS flow may correspond to different QoS parameter sets at different time points. A specific QoS parameter set, in the plurality of QoS parameter sets, that corresponds to the first QoS flow may be determined based on the QoS requirement of the target service.

Figure 5:
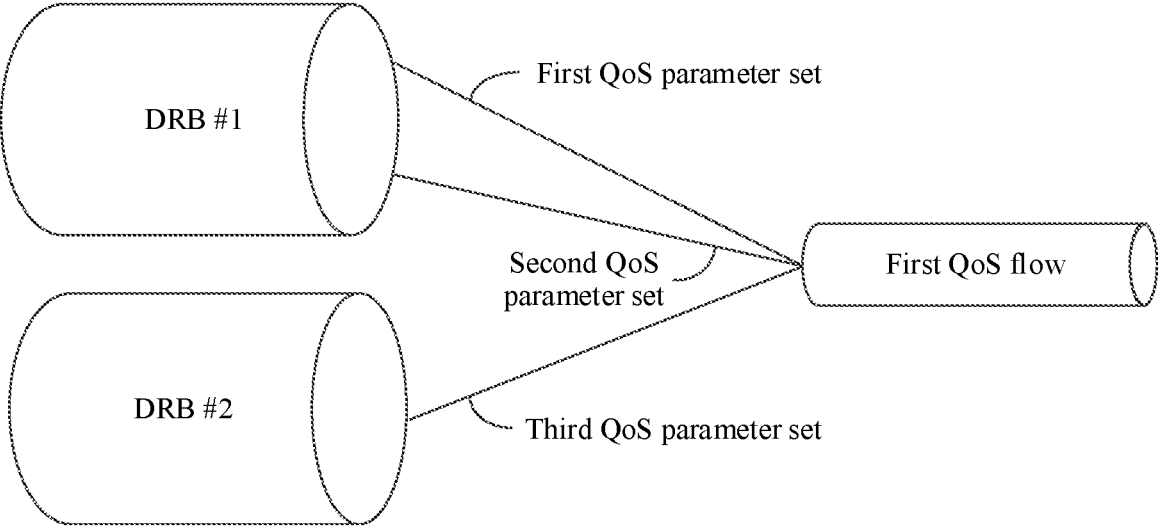
FIG. 5 is a diagram of a correspondence between DRBs, QoS parameter sets, and a first QoS flow according to an embodiment of this application.

For example, as shown in FIG. 5, the first QoS flow corresponds to three QoS parameter sets in total, a QoS parameter set corresponding to the first QoS flow in a first time period (between t1 and t2) is a $1^{st}$ QoS parameter set, a QoS parameter set corresponding to the first QoS flow in a second time period (between t2 and t3) is a $3^{rd}$ QoS parameter set, a QoS parameter set corresponding to the first QoS flow in a third time period (between t3 and t4) is a $2^{nd}$ QoS parameter set, and a QoS parameter set corresponding to the first QoS flow in a fourth time period (between t4 and t5) is the $3^{rd}$ QoS parameter set.

Based on the foregoing feature 1, the first QoS flow provided in this embodiment of this application corresponds to the plurality of QoS parameter sets. When the QoS requirement of the target service changes, the first QoS flow is correspondingly adjusted to a QoS parameter set corresponding to a changed QoS requirement. A matching degree between the QoS parameter set of the first QoS flow and the QoS requirement of the target service can be improved.

Feature 2: The First QoS Flow Corresponds to the Two Identifiers.

The two identifiers are respectively a first identifier QoS parameter identifier (QPI) and a second identifier QFI. In other words, an identifier of the first QoS flow is (QFI, QPI).

The first identifier QPI is used for representing the QoS parameter set corresponding to the first QoS flow. The QPI of the first QoS flow corresponds one-to-one to the QoS parameter set corresponding to the first QoS flow. The QPI of the first QoS flow is a variable identifier. When the QoS parameter set corresponding to the first QoS flow changes, the QPI of the first QoS flow is correspondingly adjusted to a QPI corresponding to a changed QoS parameter set.

The second identifier QFI is the same as a QoS flow identifier QFI in the conventional technology. For an understanding of the second identifier QFI, refer to the conventional technology. Details are not described herein in this application.

For example, with reference to the example in FIG. 5, the QFI of the first QoS flow is 20, and QPIs of the three QoS parameter sets corresponding to the first QoS flow are respectively 1, 2, and 3.

In the first time period, the identifier of the first QoS flow is (QFI=20, QPI=1).

In the second time period, the identifier of the first QoS flow is (QFI=20, QPI=3).

In the third time period, the identifier of the first QoS flow is (QFI=20, QPI=2).

In the fourth time period, the identifier of the first QoS flow is (QFI=20, QPI=3).

Based on the foregoing feature 2, the first identifier is set for the first QoS flow to indicate the QoS parameter set corresponding to the first QoS flow, so that each network element in a communication system can accurately determine, based on the first identifier, the QoS parameter set corresponding to the first QoS flow.

Feature 3: The First QoS Flow Corresponds to the One or More DRBs.

Specifically, in the plurality of QoS parameter sets corresponding to the first QoS flow, each QoS parameter set corresponds to one DRB, and one DRB corresponds to one or more QoS parameter sets. Therefore, the plurality of QoS parameter sets may correspond to one or more DRBs. Correspondingly, the first QoS flow also corresponds to the one or more DRBs corresponding to the plurality of QoS parameter sets.

For example, with reference to the example in FIG. 5, the $1^{st}$ QoS parameter set and the $2^{nd}$ QoS parameter set in the first QoS flow correspond to a DRB #1, and the $3^{rd}$ QoS parameter set corresponds to a DRB #2. Based on this, the first QoS flow corresponds to the DRB #1 and the DRB #2.

Based on the foregoing feature 3, the terminal device and the access network device may determine, based on the QoS parameter set corresponding to the target service, the DRB that carries the target service.

In a possible implementation, the QoS requirement of the target service is related to the service status of the target service.

The service status of the target service is an application status of the target service when the terminal device performs communication based on the target service.

In an example, when the terminal device is performing industrial communication (to be specific, the target service is the industrial communication), the service status of the target service is a status of an industrial application corresponding to the industrial communication. In this case, the terminal device may be an industrial sensor, an industrial controller, or the like.

For example, when the industrial application is industrial control, a service status corresponding to the industrial communication may be an error control state. The error control state includes any one of the following: a high error control state, a medium error control state, and a low error control state.

Alternatively, the service status of the target service is a control system stable state, and the control system stable state includes any one of the following: a stable state and an unstable state.

In another example, when the terminal device is performing AR/VR communication (to be specific, the target service is AR/VR communication), the service status of the target service is an application status of an AR/VR application corresponding to the AR/VR communication. In this case, the terminal device may be an AR/VR device.

The service status of the AR/VR communication may be either of the following: A new data frame is about to start, and a burst data amount of a data frame has been transmitted.

In this embodiment of this application, the terminal device or an application server is configured to perceive the service status of the target service. After perceiving the service status of the target service, the terminal device and the application server may indicate the service status of the target service by using an enumeration type. For example, two states, stable and unstable, are used for indicating that a control system of an industrial application is in the stable state or the unstable state.

Alternatively, the terminal device and the application server may indicate the service status of the target service by using an integer type. For example, an integer type "0" indicates that the control system of the industrial application is in the stable state, and an integer type "1" indicates that the control system of the industrial application is in the unstable state.

In a possible implementation, before the terminal device, the access network device, and the UPF transmit the data by using the first QoS flow, the method according to this embodiment of this application further includes a pre-configuration process, to configure, on the terminal device, the access network device, and the UPF, a rule for determining the first QoS flow and the first QoS parameter set.

The pre-configuration process may be implemented by using any one or more of the following manners 1 to 4:

Manner 1: The SMF configures a service status index rule and one or more QoS rules for the terminal device.

Manner 2: The SMF configures one or more QoS profiles for the access network device.

Manner 3: The SMF configures one or more downlink data packet detection rules for the UPF.

Manner 4: The access network device determines a correspondence between a QoS parameter set and a DRB, and configures the correspondence for the terminal device.

The following separately describes the foregoing manner 1 to manner 4 in detail.

Manner 1: The SMF Configures the Service Status Index Rule and the One or More QoS Rules for the Terminal Device.

The service status index rule indicates correspondences between service statuses of the target service and service status indexes. The service status index recorded in this embodiment of this application may also be referred to as a service status number.

The QoS rule indicates uplink data packet filter sets corresponding to a QoS flow in different QoS parameter sets, and a service status index corresponding to each uplink data packet filter set. One QoS rule corresponds to one QoS flow.

After the SMF configures the service status index and the one or more QoS rules for the terminal device, the terminal device may determine a current service status index of the target service based on a perceived current service status of the target service. The terminal device determines, based on the current service status index of the target service and the one or more QoS rules, an uplink data packet filter set currently corresponding to the target service. Then, the terminal device determines that a QoS parameter set corresponding to the uplink data packet filter set is a QoS parameter set currently corresponding to the target service. The terminal device determines that a QoS flow to which the QoS parameter set belongs is a QoS flow currently corresponding to the target service.

Figure 6:
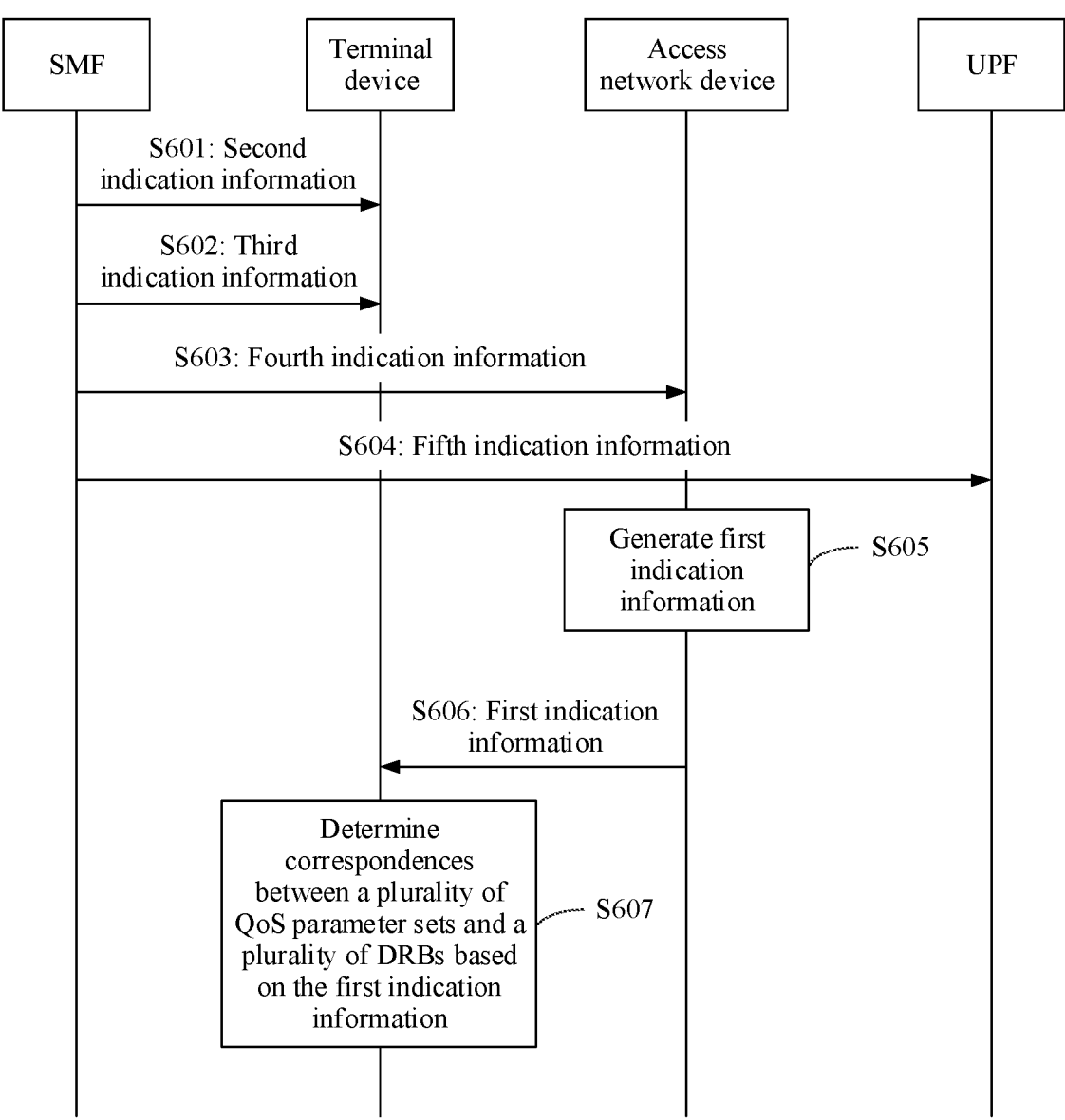
FIG. 6 is an interactive flowchart of another communication method according to an embodiment of this application.

In a specific implementation, as shown in FIG. 6, the SMF may configure the service status index rule and the one or more QoS rules for the terminal device by using S601 and S602. Details are described below.

S601: The SMF sends second indication information to the terminal device.

The second indication information indicates correspondences between a plurality of service status indexes and the plurality of QoS parameter sets.

It should be noted that in S601, the second indication information may directly indicate the correspondences between the service status indexes and the QoS parameter sets; or the second indication information may indicate correspondences between the service status indexes and uplink data packet filter sets, and indirectly indicate the correspondences between the service status indexes and the QoS parameter sets based on correspondences between the uplink data packet filter sets and the QoS parameter sets. This is not limited in this application.

In other words, the second indication information may indicate one or more QoS rules. The terminal device may determine the one or more QoS rules based on the second indication information.

In a possible implementation, before S601, the method further includes: The SMF generates the second indication information based on the correspondences between the plurality of service status indexes and the plurality of QoS parameter sets.

S602: The SMF sends third indication information to the terminal device.

The third indication information indicates the service status index rule. The service status index rule indicates the correspondences between the plurality of service status indexes of the target service and the plurality of service statuses of the target service.

In a possible implementation, the service status is of an enumerated type, and the service status index is of an integer type.

For example, if an enumeration type of a status of an industrial application in industrial communication is {"stable", "unstable" }, and a service status index is an integer type {"0", "1" }, the service status index rule is mapping the service status "stable" to the service status index "0", and the service status index rule is mapping the service status "unstable" to the service status index "1".

For another example, if a status of an industrial application in industrial communication is an integer type {"0", "1" }, and a service status index is an integer type {"0", "1" }, the service status index rule is mapping the service status "0" to the service status index "0", and the service status index rule is mapping the service status "1" to the service status index "1".

In a possible implementation, before S602, the method further includes: The SMF generates the third indication information according to the service status index rule.

The foregoing is a process in which the SMF performs pre-configuration for the terminal device.

In this way, the SMF may configure the service status index rule and the one or more QoS rules for the terminal device based on S601 and S602. The terminal device may determine, according to the perceived current service status of the target service, the service status index rule, and the QoS rule, the QoS parameter set and the QoS flow that currently correspond to the target service. In other words, two identifiers (QFI, QPI) of the QoS flow currently corresponding to the target service are determined.

Manner 2: The SMF Configures the One or More QoS Profiles for the Access Network Device.

One QoS profile corresponds to one QoS flow. The QoS profile includes a QoS parameter of each of all or some QoS parameter sets of one QoS flow.

In a specific implementation, as shown in FIG. 6, the SMF may configure the one or more QoS profiles for the access network device by using the following S603. Details are described below.

S603: The SMF sends the fourth indication information to the access network device.

The fourth indication information indicates a QoS parameter of each of the plurality of QoS parameter sets.

In other words, the fourth indication information includes the one or more QoS profiles. After the access network device receives the fourth indication information, the access network device may determine the one or more QoS profiles based on the fourth indication information, to determine the QoS parameter of each QoS parameter set of the first QoS flow.

In a possible implementation, before S603, the method further includes: The SMF generates the fourth indication information based on the QoS parameter of each of the plurality of QoS parameter sets.

Manner 3: The SMF Configures the One or More Downlink Data Packet Detection Rules for the UPF.

One downlink data packet detection rule corresponds to one QoS parameter set (QFI, QPI) of one QoS flow. The downlink data packet detection rule indicates one or more downlink data packet filters corresponding to the QoS parameter set and correspondences between the data packet filters and service status indexes.

In a specific implementation, as shown in FIG. 6, the SMF may configure the one or more downlink data packet detection rules for the terminal device by using the following S604.

S604: The SMF sends the fifth indication information to the UPF.

The fifth indication information indicates correspondences between the plurality of service status indexes and the plurality of QoS parameter sets.

In other words, the fifth indication information includes the one or more downlink data packet detection rules. After the UPF receives the fifth indication information, the terminal device may determine the one or more downlink data packet detection rules based on the fifth indication information. Further, the terminal device may determine the correspondences between the plurality of service status indexes and the plurality of QoS parameter sets according to the downlink data packet detection rule.

In a possible implementation, before S604, the method further includes: The SMF generates the fifth indication information based on the correspondences between the plurality of service status indexes and the plurality of QoS parameter sets.

Manner 4: The Access Network Device Determines the Correspondence Between a QoS Parameter Set and a DRB, and Configures the Correspondence for the Terminal Device.

One QoS parameter set corresponds to one DRB, and one DRB corresponds to one or more QoS parameter sets.

The access network device and the terminal device may determine, based on the correspondence and the current QoS parameter set of the target service, the DRB that carries the current uplink data of the target service, and transmit the current uplink data of the target service on the DRB.

In a specific implementation, as shown in FIG. 6, the access network device may determine the correspondence between a QoS parameter set and a DRB by using S605, and the access network device may configure the correspondence between a QoS parameter set and a DRB for the terminal device by using S606 and S607.

S605: The access network device generates first indication information.

The first indication information indicates correspondences between the plurality of QoS parameter sets and the plurality of DRBs.

S606: The access network device sends the first indication information to the terminal device. Correspondingly, the terminal device receives the first indication information from the access network device.

S607: The terminal device determines the correspondences between the plurality of QoS parameter sets and the plurality of DRBs based on the first indication information.

Based on the manner 4, both the access network device and the terminal device may determine the correspondences between the QoS parameter sets and the DRBs. In this way, after determining the QoS parameter set currently corresponding to the target service, the access network device and the terminal device may further determine, based on the correspondences between the QoS parameter sets and the DRBs, the DRB that carries the data of the target service.

In an implementation of this embodiment of this application, the terminal device and the UPF need to determine the QoS requirement of the target service based on the service status index of the target service. The service status index of the target service may be determined by the terminal device (denoted as a case 1), or may be determined by the application server (denoted as a case 2). Descriptions are provided below separately.

Case 1: The Terminal Device Determines the Service Status Index of the Target Service.

In the case 1, the terminal device perceives the service status of the target service by using an application layer. Then, the terminal device sends the service status of the target service to a communication layer of the terminal device, and the communication layer of the terminal device sends the service status of the target service to the UPF.

Figure 7:
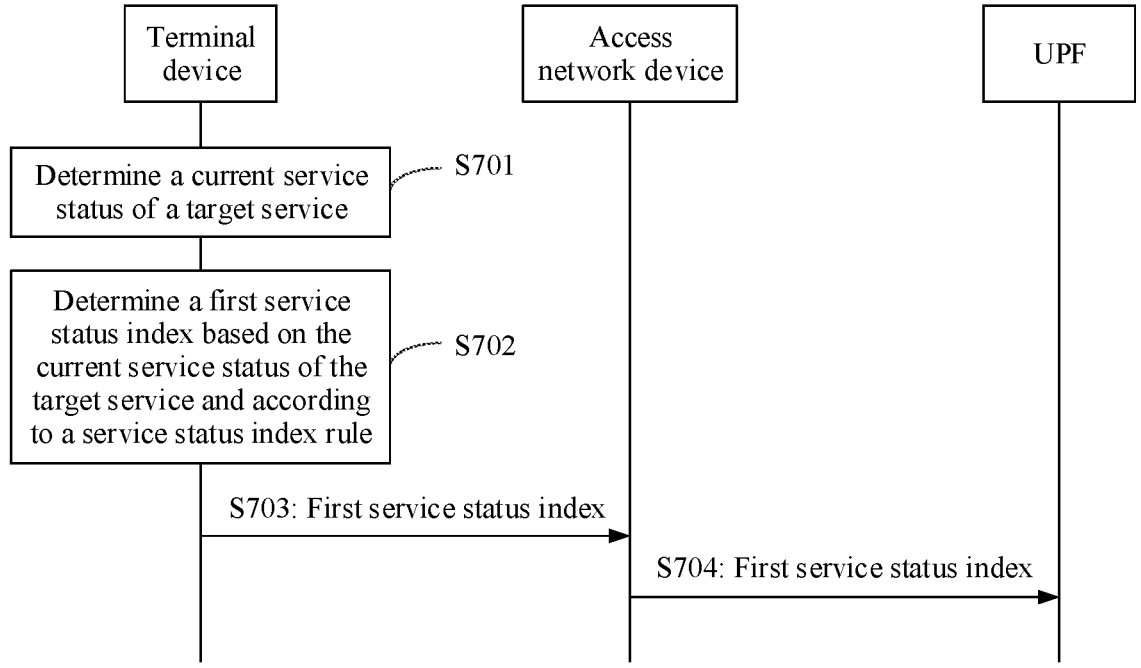
FIG. 7 is an interactive flowchart of another communication method according to an embodiment of this application.

As shown in FIG. 7, a process in which the terminal device sends the service status of the target service to the UPF includes the following steps: S701 to S704.

S701: The terminal device determines the current service status of the target service.

S702: The terminal device determines the current service status index (denoted as a first service status index) of the target service according to the current service status of the target service and the service status index rule.

In a possible implementation, the terminal device perceives the current service status of the target service by using the application layer. The application layer of the terminal device sends the current service status of the target service to the communication layer of the terminal device. The communication layer of the terminal device determines the first service status index according to the current service status of the target service and the service status index rule. Then, the communication layer of the terminal device sends the first service status index to another communication apparatus according to, for example, a method shown in S703 below.

In another possible implementation, the terminal device perceives the current service status of the target service by using the application layer, and the application layer of the terminal device determines the first service status index according to the current service status of the target service and the service status index rule. The application layer of the terminal device sends the first service status index to the communication layer of the terminal device. The communication layer of the terminal device sends the first service status index to another communication apparatus according to, for example, the method shown in S703 below.

S703: The terminal device sends the first service status index to the access network device.

In a possible implementation, the terminal device sends the first service status index to the access network device through a user plane.

Specifically, the terminal device encapsulates the first service status index into a data packet header of the data sent by the terminal device to the access network device, and sends the first service status index to the access network device.

In an example, the terminal device encapsulates the first service status index into a service data adaptation protocol (service SDAP) data PDU (SDAP data PDU) or an SDAP control PDU (SDAP control PDU) sent by the terminal device to the access network device. In other words, a header of the SDAP data PDU or the SDAP control PDU includes the first service status index, and network element such as the access network device and the UPF may determine the first service status index by parsing the header of the SDAP data PDU or the SDAP control PDU.

It should be noted that when the terminal device sends the first service status index by using a data packet header of uplink data, the terminal device may encapsulate the first service status index into a data packet header of each piece of uplink data, so that the access network device can accurately determine the first service status index corresponding to each data packet.

Alternatively, the terminal device may encapsulate the first service status index into only one or more data packet headers of one or more pieces of uplink data transmitted when the service status of the target service changes, to reduce communication resources occupied by the first service status index. This is not limited in this application.

S704: The access network device sends the first service status index to the UPF. Correspondingly, the UPF receives the first service status index from the access network device.

In a possible implementation, the access network device sends the first service status index to the UPF through the user plane.

Specifically, the access network device encapsulates the first service status index into a header of a data packet sent by the access network device to the UPF, and the access network device sends the first service status index to the UPF by using the header of the data packet.

In an example, the access network device encapsulates the first service status index into a general packet radio service tunneling protocol-user plane (general packet radio service tunneling protocol-user plane, GTP-U) header of an uplink (UpLink, UL) NG PDU, and sends the first service status index to the UPF by using the GTP-U header.

It should be noted that the UL NG PDU may carry the uplink data of the target service. In this case, the UL NG PDU is referred to as a G-PDU message. Alternatively, the UL NG PDU may not carry the uplink data of the target service. In this case, the UL NG PDU is referred to as a GTP-U signaling message.

It should be noted that, when the terminal device sends the first service status index by using the data packet header of the uplink data, the terminal device may encapsulate the first service status index into the data packet header of each piece of uplink data; or the terminal device may encapsulate the first service status index into only the one or more data packet headers of the one or more pieces of uplink data transmitted when the service status of the target service changes. This is not limited in this application.

Case 2: The Application Server Determines the Service Status Index of the Target Service.

The application server is a server that controls and manages the target service, and the application server can perceive the service status of the target service.

Figure 8:
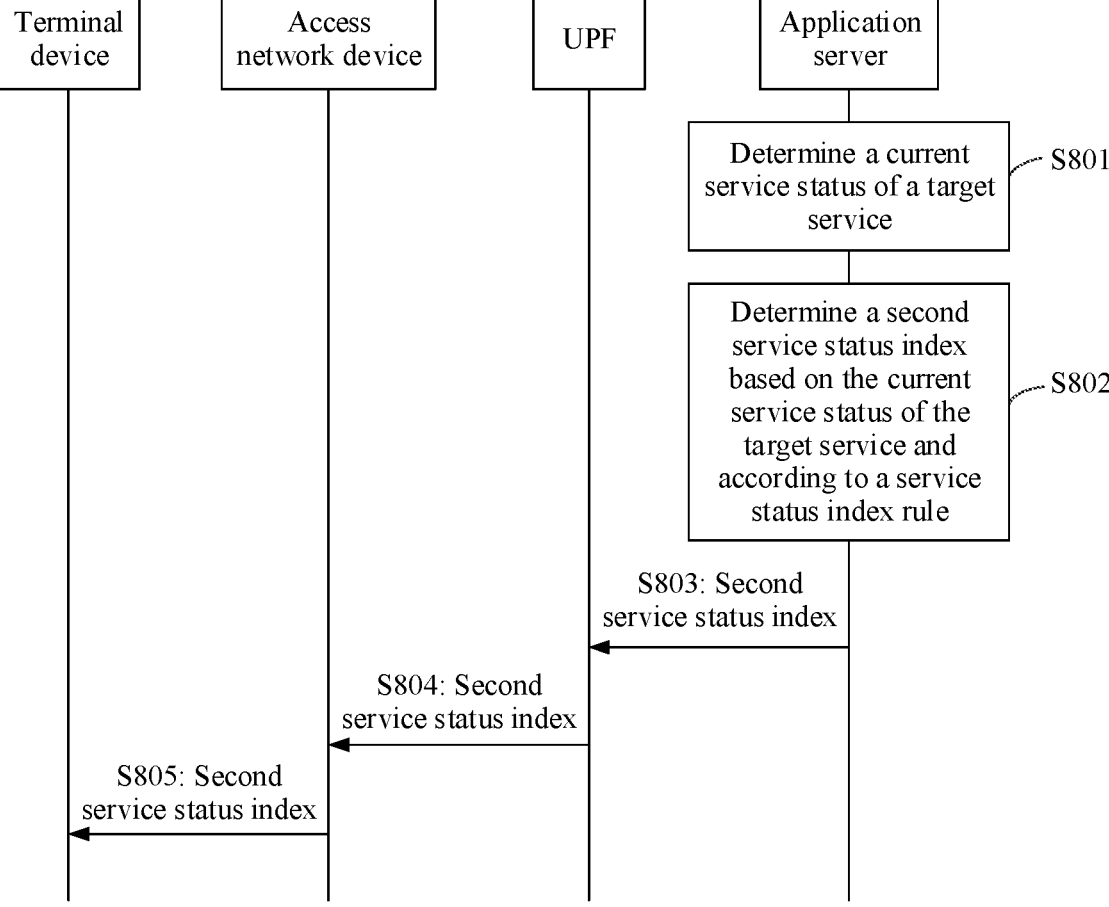
FIG. 8 is an interactive flowchart of another communication method according to an embodiment of this application.

As shown in FIG. 8, in this case, a process in which application server determines the service status index of the target service specifically includes the following steps.

S801: The application server determines the current service status of the target service.

S802: The application server determines the current service status index (denoted as a second service status index) of the target service according to the current service status of the target service and the service status index rule.

It should be noted that, before S801 and S802, the network side needs to configure the service status index rule for the application server. For example, a network exposure function (NEF) on the network side may configure the service status index rule for the application server.

After the application server configures the service status index rule, the application server performs S801 and S802 to determine the second service status index.

S803: The application server sends the second service status index to the UPF.

In a possible implementation, the application server sends the second service status index to the UPF through the user plane.

Specifically, the application server encapsulates the first service status index into a header of a data packet sent by the application server to the UPF, and synchronously sends the first service status index and the data packet to the UPF.

In an example, the application server encapsulates the second service status index into a header of an IP data packet sent by the application server to the UPF. In other words, the IP data packet sent by the application server to the UPF includes the second service status index.

S804: The UPF sends the second service status index to the access network device.

A specific implementation of S804 is similar to that of S704, and only the UL NG PDU needs to be correspondingly replaced with a downlink (DL) NG PDU. Details are not described in this application again.

S805: The access network device sends the second service status index to the terminal device.

A specific implementation of S805 is similar to that of S703. Details are not described herein again in this application.

It should be noted that, with reference to the foregoing case 1 and case 2, in this embodiment of this application, if only the application server perceives the service status and generates the service status index, and the terminal device does not need to perceive the service status and generate the service status index, the SMF may not perform S602 recorded in the manner 1. In other words, the SMF does not need to configure the service status index rule for the terminal device.

In this case, the NEF may configure the service status index rule for the application server. After perceiving the current service status of the target service, the application server determines the current service status index of the target service according to the service status index rule, and separately sends the service status index to the terminal device and the UPF.

In a possible implementation, after the case 1 or the case 2, the terminal device and the UPF may select, based on the current service status index of the target service, a corresponding DRB and a corresponding QoS flow for the target service to transmit current data of the target service. The following separately provides detailed descriptions with reference to the foregoing scenario 1 (that is, the uplink transmission scenario) and scenario 2 (that is, the downlink transmission scenario).

Figure 9:
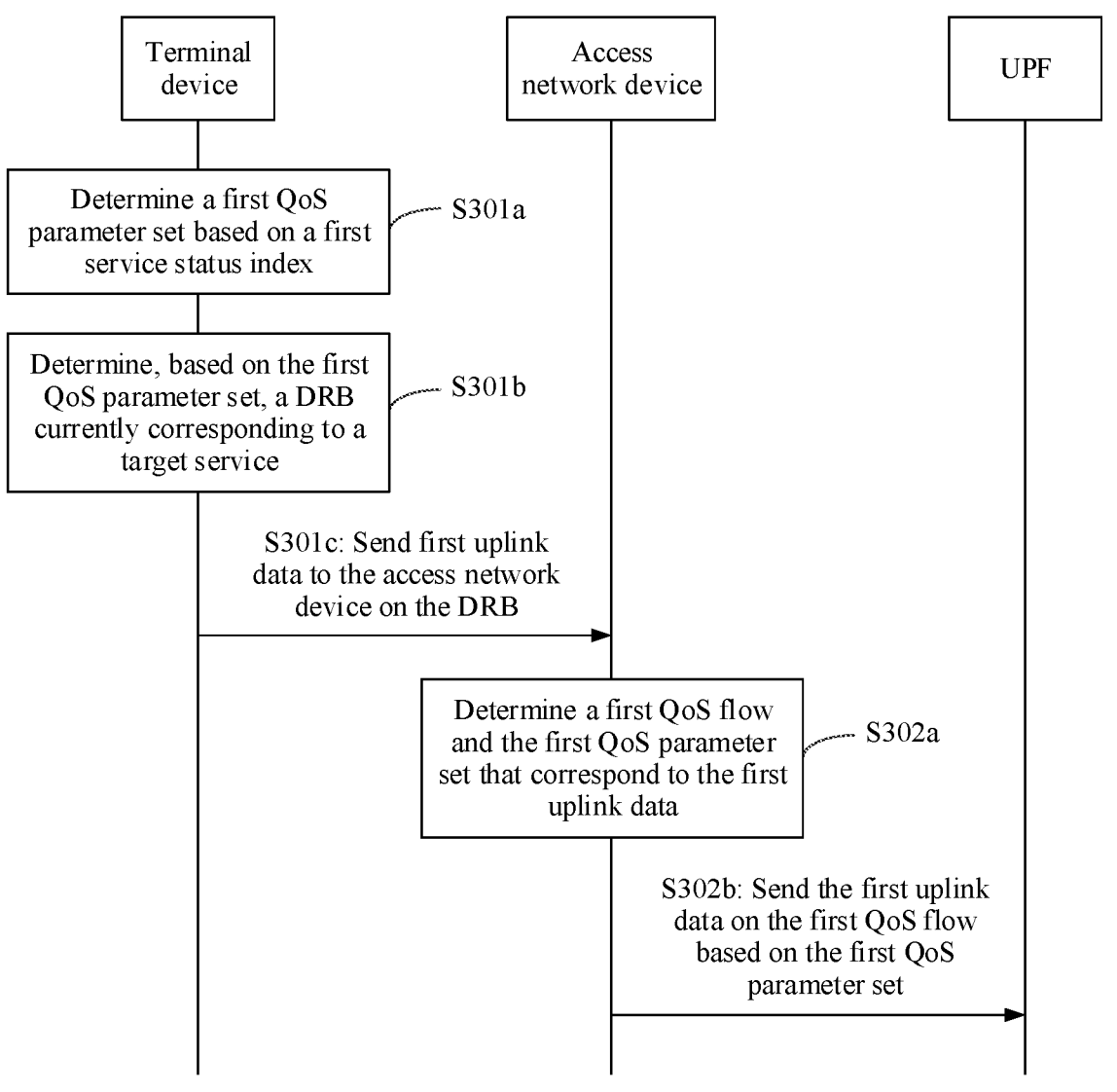
FIG. 9 is an interactive flowchart of another communication method according to an embodiment of this application.

With reference to the scenario 1:

With reference to FIG. 3, as shown in FIG. 9, S301 may be implemented by using the following S301*a* to S301*c*. S301*a* to S301*c* are described in detail below.

S301*a*: The terminal device determines, based on the first service status index, a QoS parameter set (denoted as the first QoS parameter set) currently corresponding to the target service.

Specifically, the terminal device determines, according to the first service status index and the QoS rule configured by the SMF for the terminal device in the manner 1, an uplink data packet filter set corresponding to the first service status index. The terminal device invokes the data packet filter set to filter the first uplink data of the target service, and maps the first uplink data to the QoS parameter set corresponding to the data packet filter set. The terminal device further determines a QoS flow corresponding to the QoS parameter set, and determines two identifiers (QFI, QPI) of the QoS flow based on the QoS flow and the QoS parameter set.

S301*b*: The terminal device determines, based on the first QoS parameter set, a DRB currently corresponding to the target service.

Specifically, the terminal device determines the DRB currently corresponding to the target service based on the QoS parameter set currently corresponding to the target service and the correspondence that is between a QoS parameter set and a DRB and that is configured by the access network device for the terminal device in the manner 4.

S301*c*: The terminal device sends the first uplink data to the access network device on the DRB. Correspondingly, the access network device receives the first uplink data from the terminal device on the DRB.

Correspondingly, S302 may be implemented by using the following S302*a* and S302*b*. The following describes S302*a* and S302*b* in detail.

S302*a*: The access network device determines the first QoS flow and the first QoS parameter set that correspond to first uplink data.

In a possible implementation, the terminal device adds the first identifier and the second identifier to the first uplink data to indicate the first QoS flow and the first QoS parameter set. After receiving the first uplink data, the access network device may determine, based on the first identifier and the second identifier, the first QoS flow and the first QoS paramXeter set that correspond to the first uplink data.

S302*b*: The access network device sends the first uplink data to the UPF on the first QoS flow based on the first QoS parameter set.

Figures 10, 11:
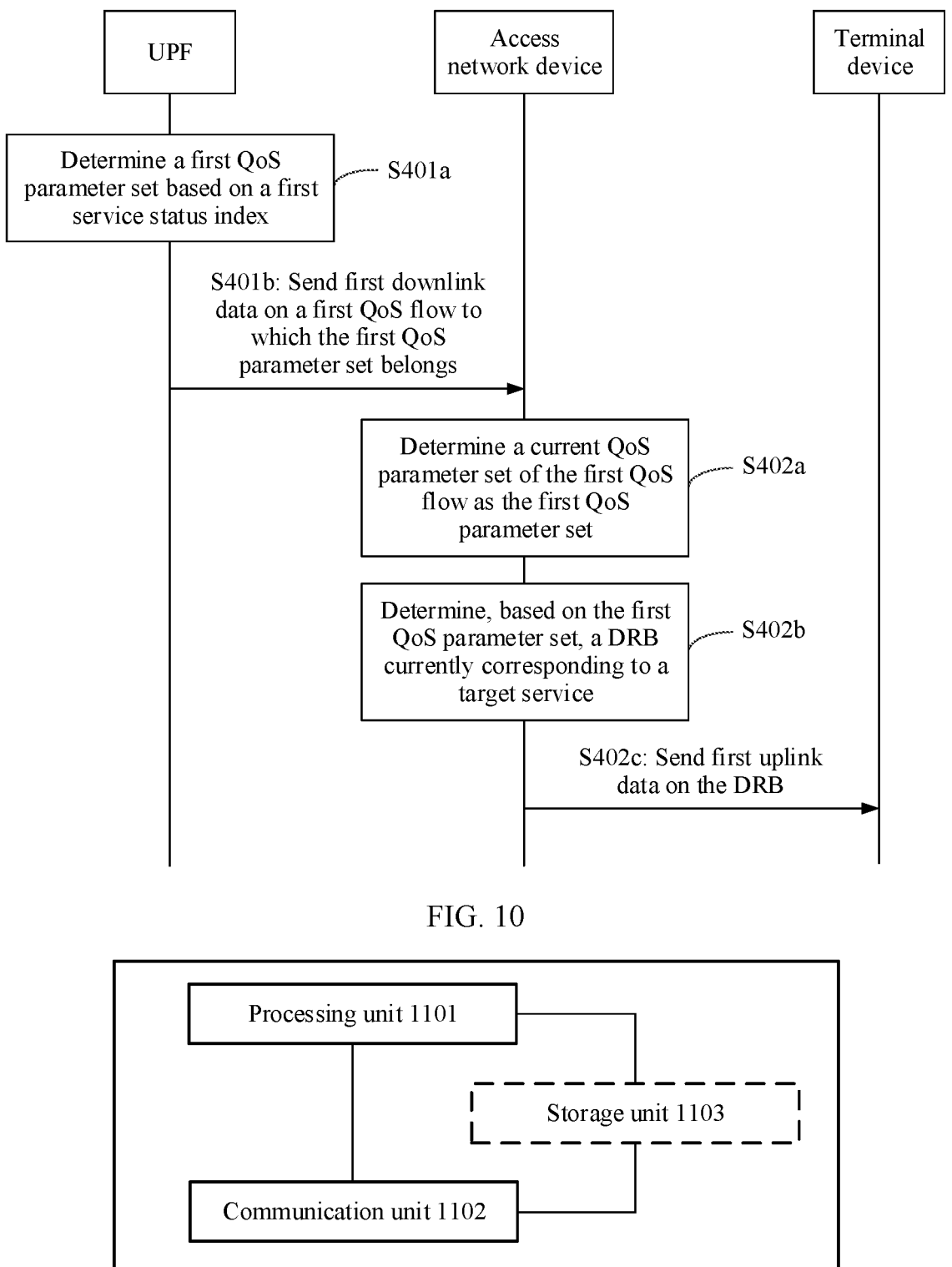
FIG. 10 is an interactive flowchart of another communication method according to an embodiment of this application.
FIG. 11 is a schematic composition diagram of a communication apparatus according to an embodiment of this application.

With reference to the scenario 2:

With reference to FIG. 4, as shown in FIG. 10, S401 may be implemented by using the following S401*a* to S401*c*. S401*a* to S401*c* are described in detail below.

S401*a*: The UPF determines, based on the first service status index, a QoS parameter set (denoted as the first QoS parameter set) currently corresponding to the target service.

A specific implementation of S401*a* is similar to that of S301*a*, and a difference lies only in that S301*a* is performed by the terminal device, and S401*a* is performed by the UPF. For a specific implementation process of S401*a*, refer to S301*a*. Details are not described herein again.

S401b: The UPF sends the first downlink data to the access network device on the first QoS flow to which the first QoS parameter set belongs.

Correspondingly, S402 may be implemented by using the following S402a to S402c. S402a to S402c are described in detail below.

S402a: After receiving the first downlink data from the UPF on the first QoS flow, the access network device determines a current QoS parameter set of the first QoS flow as the first QoS parameter set.

S402b: The access network device determines, based on the first QoS parameter set, a DRB currently corresponding to the target service.

A specific implementation of S401b is similar to that of S301b, and a difference lies only in that S301b is performed by the terminal device, and S401b is performed by the access network device. For a specific implementation process of S401b, refer to S301b. Details are not described herein again.

S402c: The access network device sends the first uplink data to the terminal device on the DRB. Correspondingly, the terminal device receives the first uplink data from the access network device on the DRB.

The foregoing mainly describes the solutions in embodiments of this application from a perspective of interaction between the network elements. It may be understood that, to implement the foregoing functions, each of the network elements, such as the terminal device, the access network device, the UPF, and the SMF, includes at least one of a corresponding hardware structure and a corresponding software module for performing each function. A person skilled in the art should be easily aware that, with reference to the units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the terminal device, the access network device, the UPF, and the SMF may be divided into functional units based on the foregoing method example. For example, each functional unit may be obtained through division based on a corresponding function, or two or more functions may be integrated into one processing unit. The integrated unit may be implemented in a form of hardware, or may be implemented in a form of a software functional unit. It should be noted that, in embodiments of this application, the unit division is an example, and is merely logical function division. In an actual implementation, another division manner may be used.

When an integrated unit is used, FIG. 11 is a possible schematic diagram of a structure of a communication apparatus (denoted as a communication apparatus 110) in the foregoing embodiments. The communication apparatus 110 includes a processing unit 1101 and a communication unit 1102, and may further include a storage unit 1103. The schematic structural diagram shown in FIG. 11 may be used for illustrating structures of the terminal device, the access network device, the UPF, and the SMF in the foregoing embodiments.

When the schematic structural diagram shown in FIG. 11 is used for illustrating the structure of the terminal device in the foregoing embodiments, the processing unit 1101 is configured to control and manage an action of the terminal device. For example, the processing unit 1101 is configured to perform S301 in FIG. 3, S402 in FIG. 4, S601 and S602 in FIG. 6, S701, S702, and S703 in FIG. 7, S805 in FIG. 8, S301a, S301b, and S301c in FIG. 9, and S401a and S401b in FIG. 10, and/or an action performed by the terminal device in another process described in embodiments of this application. The processing unit 1101 may communicate with another network entity through the communication unit 1102, for example, communicate with the access network device shown in FIG. 6. The storage unit 1103 is configured to store program code and data that are of the terminal device.

When the schematic structural diagram shown in FIG. 11 is used for illustrating the structure of the terminal device in the foregoing embodiments, the communication apparatus 110 may be a device (for example, a mobile phone), or may be a chip in the device.

When the schematic structural diagram shown in FIG. 11 is used for illustrating the structure of the access network device in the foregoing embodiments, the processing unit 1101 is configured to control and manage an action of the access network device. For example, the processing unit 1101 is configured to perform S301 and S302 in FIG. 3, S401 and S402 in FIG. 4, S603, S604, S605, and S606 in FIG. 6, S703 and S704 in FIG. 7, S804 and S805 in FIG. 8, S301c, S302a, and S302b in FIG. 9, and S401b, S402a, S402b, and S402c in FIG. 10, and/or an action performed by the access network device in another process described in embodiments of this application. The processing unit 1101 may communicate with another network entity through the communication unit 1102, for example, communicate with the terminal device shown in FIG. 6. The storage unit 1103 is configured to store program code and data that are of the access network device.

When the schematic structural diagram shown in FIG. 11 is used for illustrating the structure of the access network device in the foregoing embodiments, the communication apparatus 110 may be a device (for example, a base station), or may be a chip in the device.

When the schematic structural diagram shown in FIG. 11 is used for illustrating the structure of the UPF in the foregoing embodiments, the processing unit 1101 is configured to control and manage an action of the UPF. For example, the processing unit 1101 is configured to perform S302 in FIG. 3, S401 in FIG. 4, S606 and S607 in FIG. 6, S704 in FIG. 7, S803 and S804 in FIG. 8, S302b in FIG. 9, and S402c in FIG. 10, and/or an action performed by the UPF in another process described in embodiments of this application. The processing unit 1101 may communicate with another network entity through the communication unit 1102, for example, communicate with the access network device shown in FIG. 6. The storage unit 1103 is configured to store program code and data that are of the UPF.

When the schematic structural diagram shown in FIG. 11 is used for illustrating the structure of the UPF in the foregoing embodiments, the communication apparatus 110 may be a device (for example, a mobile phone), or may be a chip in the device.

When the schematic structural diagram shown in FIG. 11 is used for illustrating the structure of the SMF in the foregoing embodiments, the processing unit 1101 is configured to control and manage an action of the SMF. For example, the processing unit 1101 is configured to perform S601 to S604 in FIG. 6, and/or an action performed by the SMF in another process described in embodiments of this application. The processing unit 1101 may communicate with another network entity through the communication unit 1102, for example, communicate with the access network device shown in FIG. 6. The storage unit 1103 is configured to store program code and data that are of the SMF.

When the schematic structural diagram shown in FIG. 11 is used for illustrating the structure of the SMF in the foregoing embodiments, the communication apparatus 110 may be a device (for example, a mobile phone), or may be a chip in the device.

When the communication apparatus 110 is a device, the processing unit 1101 may be a processor or a controller, and the communication unit 1102 may be a communication interface, a transceiver, a transceiver machine, a transceiver circuit, a transceiver apparatus, or the like. The communication interface is a general term, and may include one or more interfaces. The storage unit 1103 may be a memory. When the communication apparatus 110 is a chip in a device, the processing unit 1101 may be a processor or a controller, and the communication unit 1102 may be an input interface and/or an output interface, a pin, a circuit, or the like. The storage unit 1103 may be a storage unit (for example, a register or a cache) in the chip, or may be a storage unit (for example, a read-only memory (ROM) or a random access memory (RAM)) that is in the device and that is located outside the chip.

The communication unit may also be referred to as a transceiver unit. An antenna and a control circuit that have receiving and sending functions in the communication apparatus 110 may be considered as the communication unit 1102 in the communication apparatus 110, and a processor that has a processing function may be considered as the processing unit 1101 in the communication apparatus 110. Optionally, a component configured to implement the receiving function in the communication unit 1102 may be considered as a receiving unit. The receiving unit is configured to perform the receiving step in embodiments of this application. The receiving unit may be a receiver machine, a receiver, a receiver circuit, or the like. A component configured to implement the sending function in the communication unit 1102 may be considered as a sending unit. The sending unit is configured to perform the sending step in embodiments of this application. The sending unit may be a transmitter machine, a transmitter, a transmitter circuit, or the like.

When an integrated unit in FIG. 11 is implemented in a form of a software functional module and sold or used as an independent product, the integrated unit may be stored in a computer-readable storage medium. Based on such an understanding, the technical solutions in embodiments of this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) or a processor to perform all or a part of the steps of the methods described in embodiments of this application. The storage medium for storing the computer software product includes: any medium that can store program code, such as a USB flash drive, a removable hard disk, a read-only memory, a random access memory, a magnetic disk, or an optical disc.

The unit in FIG. 11 may also be referred to as a module. For example, the processing unit may be referred to as a processing module.

Figure 12:
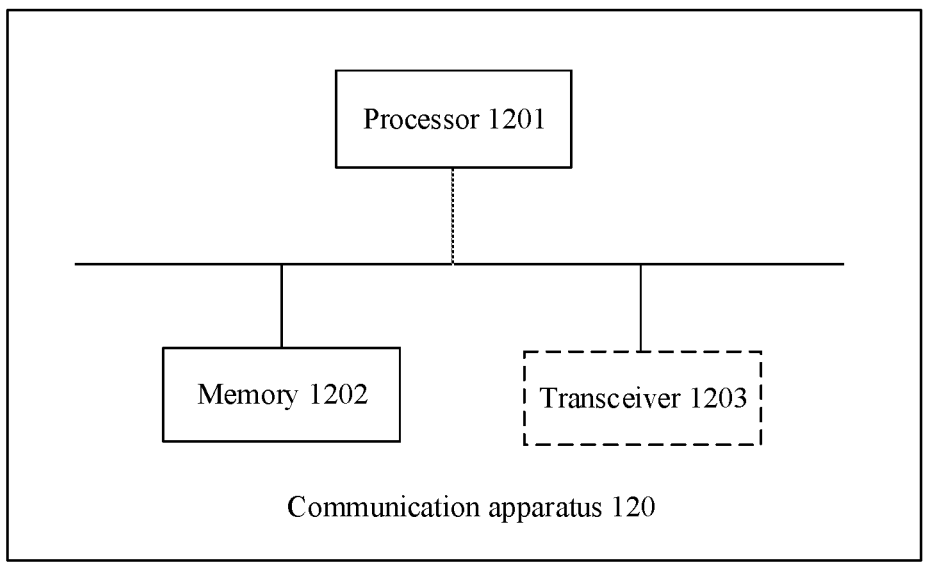
FIG. 12 is a schematic structural diagram of hardware of a communication apparatus according to an embodiment of this application.
Figure 13:
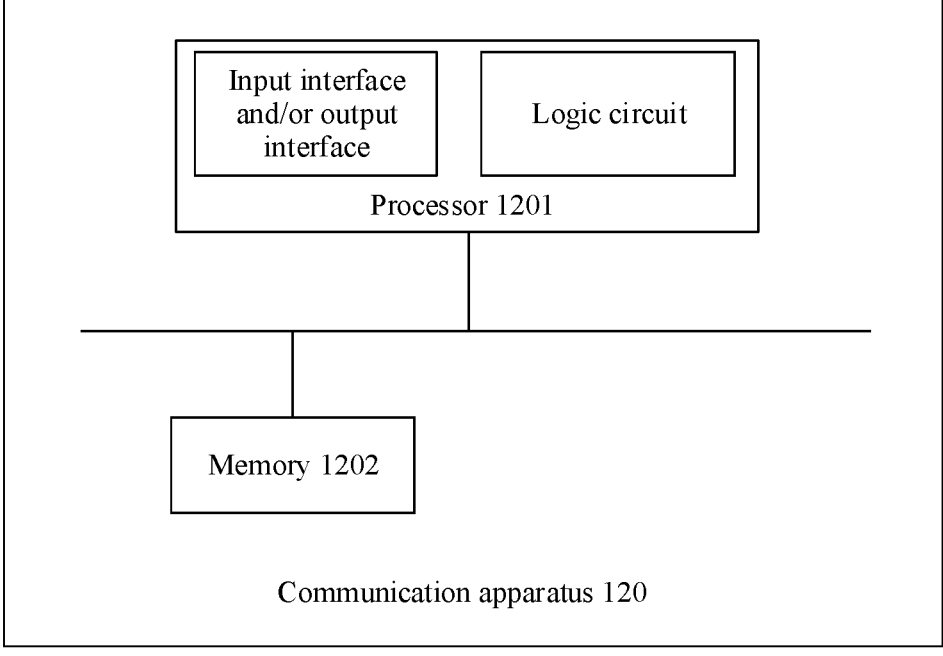
FIG. 13 is a schematic structural diagram of hardware of another communication apparatus according to an embodiment of this application.

An embodiment of this application further provides a schematic structural diagram of hardware of a communication apparatus. Refer to FIG. 12 or FIG. 13. The communication apparatus includes a processor 1201, and optionally, further includes a memory 1202 connected to the processor 1201.

The processor 1201 may be a general-purpose central processing unit (CPU), a microprocessor, an application-specific integrated circuit (ASIC), or one or more integrated circuits configured to control program execution of the solutions in this application. The processor 1201 may further include a plurality of CPUs, and the processor 1201 may be a single-core (single-CPU) processor or a multi-core (multi-CPU) processor. The processor herein may be one or more devices, circuits, or processing cores configured to process data (for example, computer program instructions).

The memory 1202 may be a ROM or another type of static storage device that can store static information and instructions, a RAM or another type of dynamic storage device that can store information and instructions, or may be an electrically erasable programmable read-only memory (EE-PROM), a compact disc read-only memory (CD-ROM) or another compact disc storage, an optical disc storage (including a compact optical disc, a laser disc, an optical disc, a digital versatile disc, a Blu-ray disc), a magnetic disk storage medium or another magnetic storage device, or any other medium that can be used for carrying or storing expected program code in a form of instructions or a data structure and that can be accessed by a computer. This is not limited in embodiments of this application. The memory 1202 may exist independently, or may be integrated with the processor 1201. The memory 1202 may include computer program code. The processor 1201 is configured to execute the computer program code stored in the memory 1202, to implement the method according to embodiments of this application.

In a first possible implementation, as shown in FIG. 12, the communication apparatus 120 further includes a transceiver 1203. The processor 1201, the memory 1202, and the transceiver 1203 are connected through a bus. The transceiver 1203 is configured to communicate with another device or communication network. Optionally, the transceiver 1203 may include a transmitter and a receiver. A component configured to implement a receiving function in the transceiver 1203 may be considered as the receiver. The receiver is configured to perform the receiving step in embodiments of this application. A component configured to implement a sending function in the transceiver 1203 may be considered as the transmitter. The transmitter is configured to perform the sending step in embodiments of this application.

Based on the first possible implementation, the schematic structural diagram shown in FIG. 12 may be used for illustrating structures of the terminal device and the access network device in the foregoing embodiments.

When the schematic structural diagram shown in FIG. 12 is used for illustrating the structure of the terminal device in the foregoing embodiments, the processor 1201 is configured to control and manage an action of the terminal device. For example, the processor 1201 is configured to support the terminal device in performing S301 in FIG. 3, S402 in FIG. 4, S601 and S602 in FIG. 6, S701, S702, and S703 in FIG. 7, S805 in FIG. 8, S301*a*, S301*b*, and S301*c* in FIG. 9, and S401*a* and S401*b* in FIG. 10; and/or an action performed by the terminal device in another process described in embodiments of this application. The processor 1201 may communicate with another network entity through the transceiver 1203, for example, communicate with the access network device shown in FIG. 6. The memory 1202 is configured to store program code and data that are of the terminal device.

When the schematic structural diagram shown in FIG. 12 is used for illustrating the structure of the access network device in the foregoing embodiments, the processor 1201 is configured to control and manage an action of the access network device. For example, the processor 1201 is configured to support the access network device in performing S301 and S302 in FIG. 3, S401 and S402 in FIG. 4, S603, S604, S605, and S606 in FIG. 6, S703 and S704 in FIG. 7, S804 and S805 in FIG. 8, S301c, S302a, and S302b in FIG. 9, and S401b, S402a, S402b, and S402c in FIG. 10; and/or an action performed by the access network device in another process described in embodiments of this application. The processor 1201 may communicate with another network entity through the transceiver 1203, for example, communicate with the terminal device shown in FIG. 6. The memory 1202 is configured to store program code and data that are of the access network device.

When the schematic structural diagram shown in FIG. 12 is used for illustrating a structure of the UPF in the foregoing embodiments, the processor 1201 is configured to control and manage an action of the UPF. For example, the processor 1201 is configured to support the UPF in performing S302 in FIG. 3, S401 in FIG. 4, S606 and S607 in FIG. 6, S704 in FIG. 7, S803 and S804 in FIG. 8, S302b in FIG. 9, and S402c in FIG. 10; and/or an action performed by the UPF in another process described in embodiments of this application. The processor 1201 may communicate with another network entity through the transceiver 1203, for example, communicate with the access network device shown in FIG. 6. The memory 1202 is configured to store program code and data that are of the UPF.

When the schematic structural diagram shown in FIG. 12 is used for illustrating a structure of the SMF in the foregoing embodiments, the processor 1201 is configured to control and manage an action of the SMF. For example, the processor 1201 is configured to support the SMF in performing S601 to S604 in FIG. 6, and/or an action performed by the SMF in another process described in embodiments of this application. The processor 1201 may communicate with another network entity through the transceiver 1203, for example, communicate with the access network device shown in FIG. 6. The memory 1202 is configured to store program code and data that are of the SMF.

In a second possible implementation, the processor 1201 includes a logic circuit and at least one of an input interface and an output interface. The output interface is configured to perform a sending action in a corresponding method, and the input interface is configured to perform a receiving action in a corresponding method.

Based on the second possible implementation, the schematic structural diagram shown in FIG. 13 may be used for illustrating structures of the terminal device and the access network device in the foregoing embodiments.

When the schematic structural diagram shown in FIG. 13 is used for illustrating the structure of the terminal device in the foregoing embodiments, the processor 1201 is configured to control and manage an action of the terminal device. For example, the processor 1201 is configured to support the terminal device in performing S301 in FIG. 3, S402 in FIG. 4, S601 and S602 in FIG. 6, S701, S702, and S703 in FIG. 7, S805 in FIG. 8, S301a, S301b, and S301c in FIG. 9, and S401a and S401b in FIG. 10; and/or an action performed by the terminal device in another process described in embodiments of this application. The processor 1201 may communicate with another network entity through at least one of the input interface and the output interface, for example, communicate with the access network device shown in FIG. 6. The memory 1202 is configured to store program code and data that are of the terminal device.

When the schematic structural diagram shown in FIG. 13 is used for illustrating the structure of the access network device in the foregoing embodiments, the processor 1201 is configured to control and manage an action of the access network device. For example, the processor 1201 is configured to support the access network device in performing S301 and S302 in FIG. 3, S401 and S402 in FIG. 4, S603, S604, S605, and S606 in FIG. 6, S703 and S704 in FIG. 7, S804 and S805 in FIG. 8, S301c, S302a, and S302b in FIG. 9, and S401b, S402a, S402b, and S402c in FIG. 10; and/or an action performed by the access network device in another process described in embodiments of this application. The processor 1201 may communicate with another network entity through at least one of the input interface and the output interface, for example, communicate with the terminal device shown in FIG. 6. The memory 1202 is configured to store program code and data that are of the access network device.

When the schematic structural diagram shown in FIG. 13 is used for illustrating a structure of the UPF in the foregoing embodiments, the processor 1201 is configured to control and manage an action of the UPF. For example, the processor 1201 is configured to support the UPF in performing S302 in FIG. 3, S401 in FIG. 4, S606 and S607 in FIG. 6, S704 in FIG. 7, S803 and S804 in FIG. 8, S302b in FIG. 9, and S402c in FIG. 10; and/or an action performed by the UPF in another process described in embodiments of this application. The processor 1201 may communicate with another network entity through at least one of the input interface and the output interface, for example, communicate with the access network device shown in FIG. 6. The memory 1202 is configured to store program code and data that are of the UPF.

When the schematic structural diagram shown in FIG. 13 is used for illustrating a structure of the SMF in the foregoing embodiments, the processor 1201 is configured to control and manage an action of the SMF. For example, the processor 1201 is configured to support the SMF in performing S601 to S604 in FIG. 6, and/or an action performed by the SMF in another process described in embodiments of this application. The processor 1201 may communicate with another network entity through at least one of the input interface and the output interface, for example, communicate with the access network device shown in FIG. 6. The memory 1202 is configured to store program code and data that are of the SMF.

In an implementation process, the steps in the method according to this embodiment may be completed by using a hardware integrated logic circuit in the processor, or by using instructions in a form of software. The steps of the method disclosed with reference to embodiments of this application may be directly performed by a hardware processor, or may be performed by a combination of hardware in the processor and a software module.

An embodiment of this application further provides a computer-readable storage medium, including instructions. When the instructions are run on a computer, the computer is enabled to perform any one of the foregoing methods.

An embodiment of this application further provides a computer program product including instructions. When the instructions are run on a computer, the computer is enabled to perform any one of the foregoing methods.

An embodiment of this application further provides a communication apparatus, including a processor and an interface. The processor is coupled to a memory through the interface. When the processor executes a computer program or computer-executable instructions in the memory, any one of the foregoing methods is performed.

An embodiment of this application further provides a communication system, including a terminal device, an access network device, a UPF, and an SMF.

All or some of the foregoing embodiments may be implemented by using software, hardware, firmware, or any combination thereof. When a corresponding software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are set forth in dependent claims that are different from each other, but this does not mean that these measures cannot be combined to produce a great effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A communication method, comprising:
determining, by a terminal device, first uplink data of a target service;
determining, by the terminal device, based on a current service status of the target service, a first quality of service QoS parameter set;
sending, by the terminal device, the first uplink data to an access network device on a data radio bearer (DRB) corresponding to the QoS parameter set, wherein the QoS parameter set is of a plurality of QoS parameter sets corresponding to a first QoS flow and corresponds to a QoS requirement of the first uplink data, and the first QoS flow is used for transmitting uplink data of the target service;
wherein the QoS parameter set corresponds to a service status index of a plurality of service status indexes of the target service, and used for representing a QoS requirement of the target service in a current service status; and one of the plurality of service status indexes corresponds to one of the plurality of QoS parameter sets; and
receiving, by the terminal device, second indication information from a session management function (SMF), wherein the second indication information indicates correspondences between the plurality of service status indexes and the plurality of QoS parameter sets, correspondences between the plurality of service status indexes and a plurality of uplink data packet filter sets, and one of the plurality of uplink data packet filter sets corresponds to one of the plurality of QoS parameter sets.

2. The method according to claim 1, wherein a plurality of DRBs are between the terminal device and the access network device, one of the plurality of QoS parameter sets corresponds to one of the plurality of DRBs, and one of the plurality of DRBs corresponds to one or more of the plurality of QoS parameter sets.

3. The method according to claim 2, further comprising:
receiving, by the terminal device, first indication information from the access network device, wherein the first indication information indicates correspondences between the plurality of QoS parameter sets and the plurality of DRBs.

4. The method according to claim 1, further comprising:
sending, by the terminal device, a first identifier to the access network device, wherein the first identifier indicates the QoS parameter set of the first QoS flow.

5. The method according to claim 1, further comprising:
determining, by the terminal device, the service status index based on the current service status of the target service and according to a service status index rule that indicates correspondences between the plurality of service status indexes of the target service and a plurality of service statuses of the target service.

6. The method according to claim 5, further comprising:
receiving, by the terminal device from the SMF, third indication information indicating the service status index rule.

7. The method according to claim 1, further comprising:
sending, by the terminal device, the service status index to a user plane function UPF.

8. The method according to claim 1, wherein the service status index is sent by an application server to the terminal device.

9. A communication apparatus, comprising:
at least one processor; and one or more memories coupled to the at least one processor and storing program instructions for execution by the at least one processor to:

determine first uplink data of a target service;

determine, based on a current service status of the target service, a first quality of service (QoS) parameter set;

send the first uplink data to an access network device on a data radio bearer (DRB) corresponding to the a QoS parameter set, wherein the QoS parameter set is of a plurality of QoS parameter sets corresponding to a first QoS flow and corresponds to a QoS requirement of the first uplink data, and the first QoS flow is used for transmitting the uplink data of the target service;

wherein the QoS parameter set corresponds to a service status index of a plurality of service status indexes of the target service, and used for representing a QoS requirement of the target service in a current service status; and one of the plurality of service status indexes corresponds to one of the plurality of QoS parameter sets; and receive, by the terminal device, second indication information from a session management function (SMF), wherein the second indication information indicates correspondences between the plurality of service status indexes and the plurality of QoS parameter sets, correspondences between the plurality of service status indexes and a plurality of uplink data packet filter sets, and one of the plurality of uplink data packet filter sets corresponds to one of the plurality of QoS parameter sets.

10. The apparatus according to claim 9, wherein a plurality of DRBs are between a terminal device and the access network device, one of the plurality of QoS parameter sets corresponds to one of the plurality of DRBs, and one of the plurality of DRBs corresponds to one or more of the plurality of QoS parameter sets.

11. The apparatus according to claim 10, wherein the program instructions, when executed by the at least one processor, further:

receive first indication information from the access network device, wherein the first indication information indicates correspondences between the plurality of QoS parameter sets and the plurality of DRBs.

12. The apparatus according to claim 9, wherein the program instructions, when executed by the at least one processor, further:

send a first identifier to the access network device, wherein the first identifier indicates the QoS parameter set of the first QoS flow.

13. The apparatus according to claim 9, wherein the QoS parameter set corresponds to a service status index;

the service status index is of a plurality of service status indexes of the target service, used for representing a QoS requirement of the target service in a current service status; and one of the plurality of service status indexes corresponds to one of the plurality of QoS parameter sets.

14. A non-transitory computer-readable storage medium storing instructions that when run on a computer, enables the computer to:

determine first uplink data of a target service;

determine, based on a current service status of the target service, a first quality of service QoS parameter set;

send the first uplink data to an access network device on a data radio bearer (DRB) corresponding to the QoS parameter set, wherein the QoS parameter set is of a plurality of QoS parameter sets corresponding to a first QoS flow and corresponds to a QoS requirement of the first uplink data, and the first QoS flow is used for transmitting uplink data of the target service;

wherein the QoS parameter set corresponds to a service status index of a plurality of service status indexes of the target service, and used for representing a QoS requirement of the target service in a current service status; and one of the plurality of service status indexes corresponds to one of the plurality of QoS parameter sets; and receive second indication information that indicates correspondences between the plurality of service status indexes and the plurality of QoS parameter sets.

15. The non-transitory computer-readable storage medium according to claim 14, wherein when the instructions are run on a computer, the computer is further enabled to receive first indication information that indicates correspondences between the plurality of QoS parameter sets and a plurality of DRBs.

16. The non-transitory computer-readable storage medium according to claim 14, wherein when the instructions are run on a computer, the computer is further enabled to send a first identifier that indicates the QoS parameter set of the first QoS flow.

17. The non-transitory computer-readable storage medium according to claim 14, wherein when the instructions are run on a computer, the computer is further enabled to determine the service status index based on the current service status of the target service and according to a service status index rule that indicates correspondences between the plurality of service status indexes of the target service and a plurality of service statuses of the target service.

18. The non-transitory computer-readable storage medium according to claim 17, wherein when the instructions are run on a computer, the computer is further enabled to receive third indication information indicating the service status index rule.

* * * * *